United States Patent
Bender

(10) Patent No.: US 6,927,273 B2
(45) Date of Patent: Aug. 9, 2005

(54) PROCESS FOR PREPARING SUBSTITUTED POLYARYLENE ETHERS

(75) Inventor: Timothy P. Bender, Port Credit (CA)

(73) Assignee: Xerox Corporation, Stamford, CT (US)

( * ) Notice: Subject to any disclaimer, the term of this patent is extended or adjusted under 35 U.S.C. 154(b) by 202 days.

(21) Appl. No.: 10/322,110

(22) Filed: Dec. 17, 2002

(65) Prior Publication Data
US 2004/0122204 A1 Jun. 24, 2004

(51) Int. Cl.$^7$ .............................................. C08G 14/00
(52) U.S. Cl. ...................... 528/125; 528/126; 528/220; 528/488; 528/492; 528/501; 528/503; 525/310; 525/471; 525/534
(58) Field of Search ................................ 528/125, 126, 528/220, 488, 492, 501, 503; 525/310, 471, 534

(56) References Cited

U.S. PATENT DOCUMENTS

| | | | |
|---|---|---|---|
| 5,739,254 A | 4/1998 | Fuller et al. | 528/125 |
| 5,753,783 A | 5/1998 | Fuller et al. | 525/471 |
| 5,761,809 A | 6/1998 | Fuller et al. | 29/890.1 |
| 5,773,553 A | 6/1998 | Fuller et al. | 528/170 |
| 5,814,426 A | 9/1998 | Fuller et al. | 430/96 |
| 5,849,809 A | 12/1998 | Narang et al. | 522/35 |
| 5,863,963 A | 1/1999 | Narang et al. | 522/162 |
| 5,869,595 A | 2/1999 | Fuller et al. | 528/322 |
| 5,874,192 A | 2/1999 | Fuller et al. | 430/58 |
| 5,882,814 A | 3/1999 | Fuller et al. | 430/59 |
| 5,889,077 A | 3/1999 | Fuller et al. | 522/162 |
| 5,939,206 A | 8/1999 | Kneezel et al. | 128/480 |
| 5,945,253 A | 8/1999 | Narang et al. | 430/280.1 |
| 5,958,995 A | 9/1999 | Narang et al. | 522/35 |
| 5,994,425 A | 11/1999 | Narang et al. | 522/35 |
| 6,007,877 A | 12/1999 | Narang et al. | 427/510 |
| 6,020,119 A | 2/2000 | Foucher et al. | 430/627 |
| 6,022,095 A | 2/2000 | Narang et al. | 347/20 |
| 6,087,414 A | 7/2000 | Fuller et al. | 522/162 |
| 6,090,453 A | 7/2000 | Narang et al. | 427/504 |
| 6,117,967 A | 9/2000 | Fuller et al. | 528/125 |
| 6,124,372 A | 9/2000 | Smith et al. | 522/35 |
| 6,139,920 A | 10/2000 | Smith et al. | 427/510 |
| 6,151,042 A | 11/2000 | Smith et al. | 347/20 |
| 6,174,636 B1 | 1/2001 | Fuller et al. | 430/58.7 |
| 6,177,238 B1 | 1/2001 | Fuller et al. | 430/320 |
| 6,184,263 B1 | 2/2001 | Narang et al. | 522/111 |
| 6,187,512 B1 | 2/2001 | Foucher et al. | 430/311 |
| 6,203,143 B1 | 3/2001 | Narang et al. | 347/65 |
| 6,260,949 B1 | 7/2001 | Smith et al. | 347/44 |
| 6,260,956 B1 | 7/2001 | Narang et al. | 347/63 |
| 6,273,543 B1 | 8/2001 | Narang et al. | 347/20 |
| 6,273,985 B1 | 8/2001 | DeLouise et al. | 156/273.3 |
| 6,323,301 B1 | 11/2001 | Smith et al. | 528/125 |
| 6,365,323 B1 | 4/2002 | Narang et al. | 430/280.1 |
| 6,716,956 B2 * | 4/2004 | Bender et al. | 528/125 |

FOREIGN PATENT DOCUMENTS

| | | |
|---|---|---|
| EP | 826700 | 3/1998 |
| EP | 827026 | 3/1998 |
| EP | 827027 | 3/1998 |
| EP | 827028 | 3/1998 |
| EP | 827029 | 3/1998 |
| EP | 827030 | 3/1998 |
| EP | 827031 | 3/1998 |
| EP | 827032 | 3/1998 |
| EP | 827033 | 3/1998 |
| EP | 918256 | 5/1999 |
| EP | 918257 | 5/1999 |
| EP | 918258 | 5/1999 |

* cited by examiner

Primary Examiner—Duc Truong
(74) Attorney, Agent, or Firm—Judith L. Byorick

(57) ABSTRACT

Processes for preparing polymers of the formula

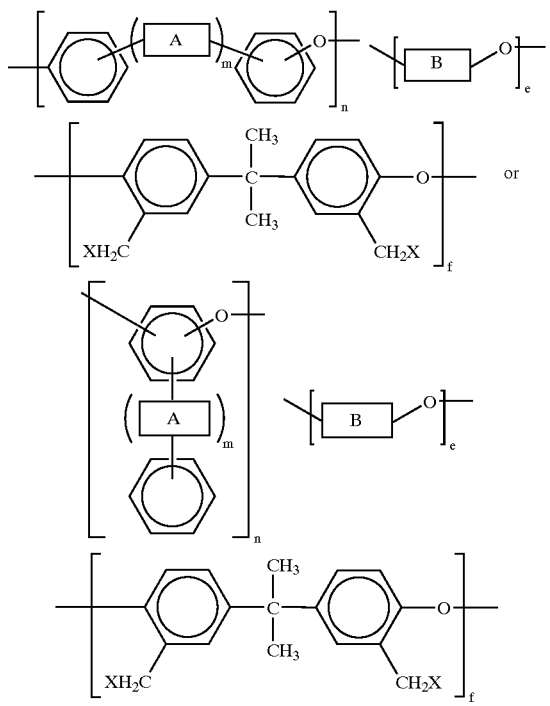

wherein m is 0 or 1, X is chlorine, bromine, or iodine, and n, e, and f are each, independently of the others, integers wherein e may be 0 and n and f are each at least 1 by providing a first reaction mixture containing a first solvent, a compound of the formula

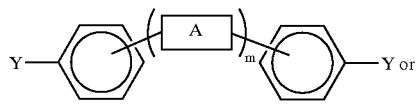

-continued

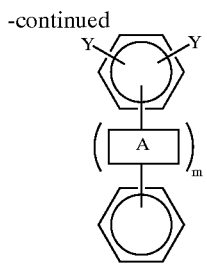

wherein Y is a chlorine or fluorine atom, a compound of the formula

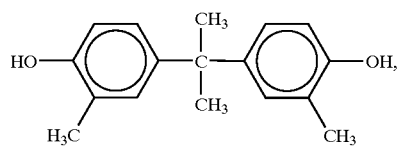

and optionally, a compound of the formula

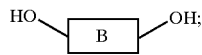

heating the first reaction mixture and removing generated water therefrom, thereby forming an intermediate polymer of the formula

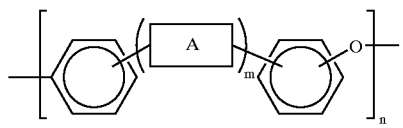

-continued

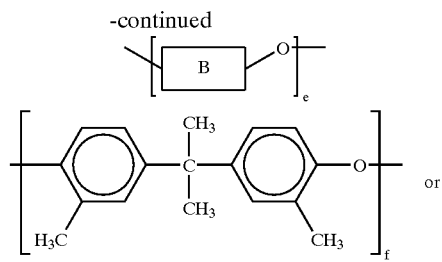 or

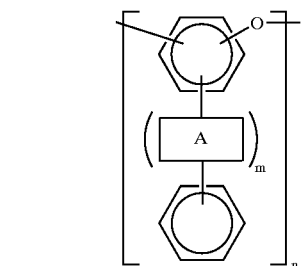

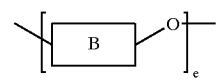

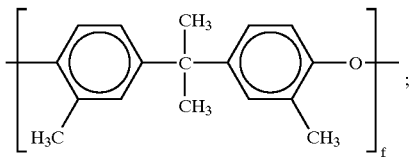

providing a second reaction mixture containing a second solvent, the intermediate polymer, and a N-halosuccinimide, wherein the halogen atom in the N-halosuccinimide is the same as the halogen atom that is X; and heating the second reaction mixture, thereby forming the polymer.

49 Claims, No Drawings

PROCESS FOR PREPARING SUBSTITUTED POLYARYLENE ETHERS

Cross-reference is hereby made to the following copending applications:

Copending Application U.S. Ser. No. 10/040,850, filed Jan. 9, 2002, entitled "Process for Preparing Polyarylene Ethers," with the named inventors Timothy P. Bender, Christine DeVisser, Richard A. Burt, Paul F. Smith, and Marko D. Saban, the disclosure of which is totally incorporated herein by reference, discloses a process for preparing a polymer of the formula

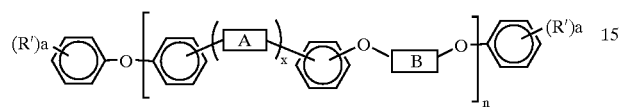

or

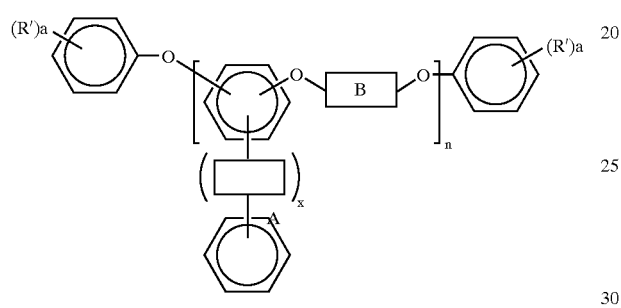

wherein x is an integer of 0 or 1, A is one of several specified groups, such as

B is one of several specified groups, such as

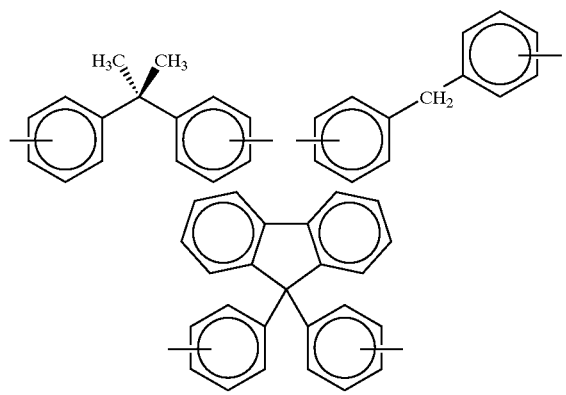

or mixtures thereof, and n is an integer representing the number of repeating monomer units, said process comprising (A) providing a reaction mixture which comprises (i) a solvent, (ii) a compound of the formula

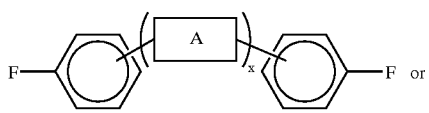

or

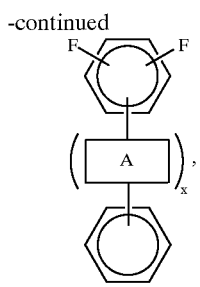

(iii) a compound of the formula

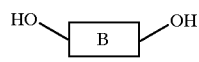

(iv) a compound of the formula

wherein a is an integer of from 1 to 5, R' is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, or a mixture thereof, and (v) a carbonate base; and (B) heating the reaction mixture and removing generated water from the reaction mixture, thereby effecting a polymerization reaction.

Copending Application U.S. Ser. No. 10/036,469, filed Jan. 7, 2002, entitled "High Performance Curable Polymers and Processes for the Preparation Thereof," with the named inventors Ram S. Narang and Timothy J. Fuller, the disclosure of which is totally incorporated herein by reference, discloses a composition which comprises a polymer containing at least some monomer repeat units with photosensitivity-imparting substituents which enable crosslinking or chain extension of the polymer upon exposure to actinic radiation, said polymer being of the formula

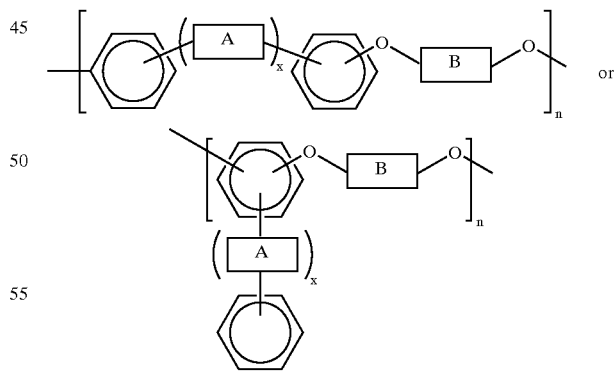

wherein x is an integer of 0 or 1, A is one of several specified groups, such as

B is one of several specified groups, such as

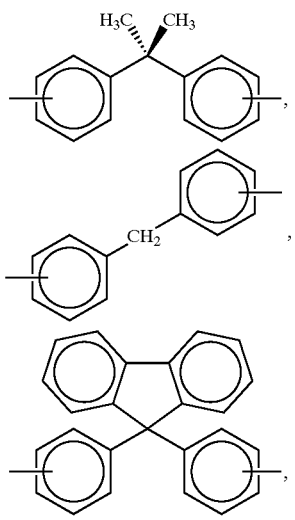

or mixtures thereof, and n is an integer representing the number of repeating monomer units, wherein said photosensitivity-imparting substituents are allyl ether groups, epoxy groups, or mixtures thereof. Also disclosed are a process for preparing a thermal ink jet printhead containing the aforementioned polymers and processes for preparing the aforementioned polymers.

Copending Application U.S. Ser. No. 09/844,371, filed Apr. 27, 2001, entitled "Bonding Process," with the named inventors Lisa A. DeLouise and David J. Luca, the disclosure of which is totally incorporated herein by reference, discloses a process for bonding a first article to a second article which comprises (a) providing a first article comprising a polymer having photosensitivity-imparting substituents; (b) providing a second article comprising metal, plasma nitride, silicon, or glass; (c) applying to at least one of the first article and the second article an adhesion promoter selected from silanes, titanates, or zirconates having (i) alkoxy, aryloxy, or arylalkyloxy functional groups and (ii) functional groups including at least one photosensitive aliphatic >C=C< linkage; (d) placing the first article in contact with the second article; and (e) exposing the first article, second article, and adhesion promoter to radiation, thereby bonding the first article to the second article with the adhesion promote. In one embodiment of the present invention, the adhesion promoter is employed in microelectrical mechanical systems such as thermal ink jet printheads.

BACKGROUND OF THE INVENTION

The present invention is directed to methods for preparing halomethylated high performance polyarylene ether polymers. One embodiment of the present invention is directed to a process for preparing a polymer of the formula

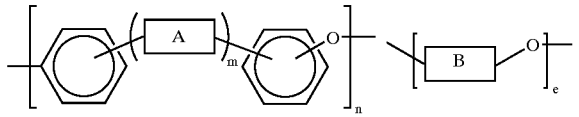

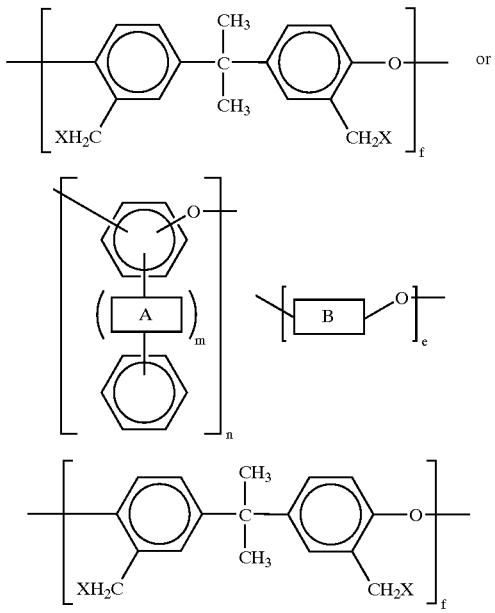

wherein m is an integer of 0 or 1, X is a halogen atom which is chlorine, bromine, or iodine, A is

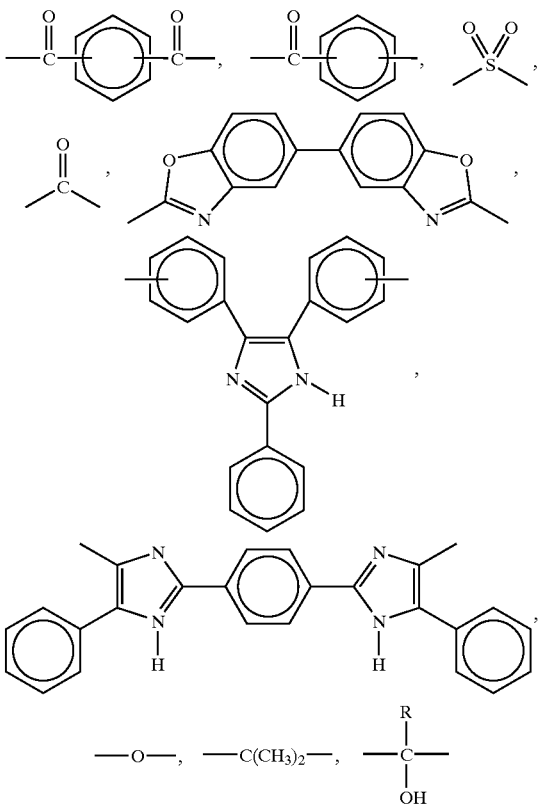

wherein R is an alkyl group, an aryl group, or mixtures thereof,

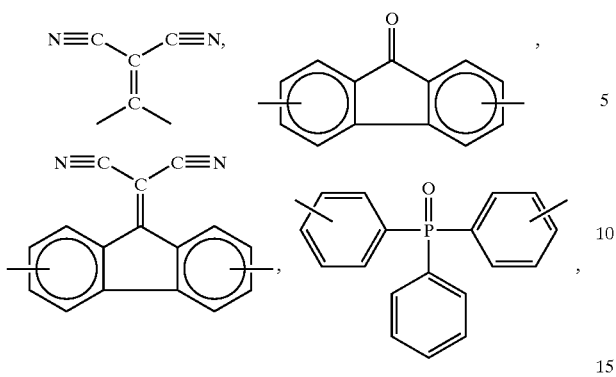
or mixtures thereof, B is
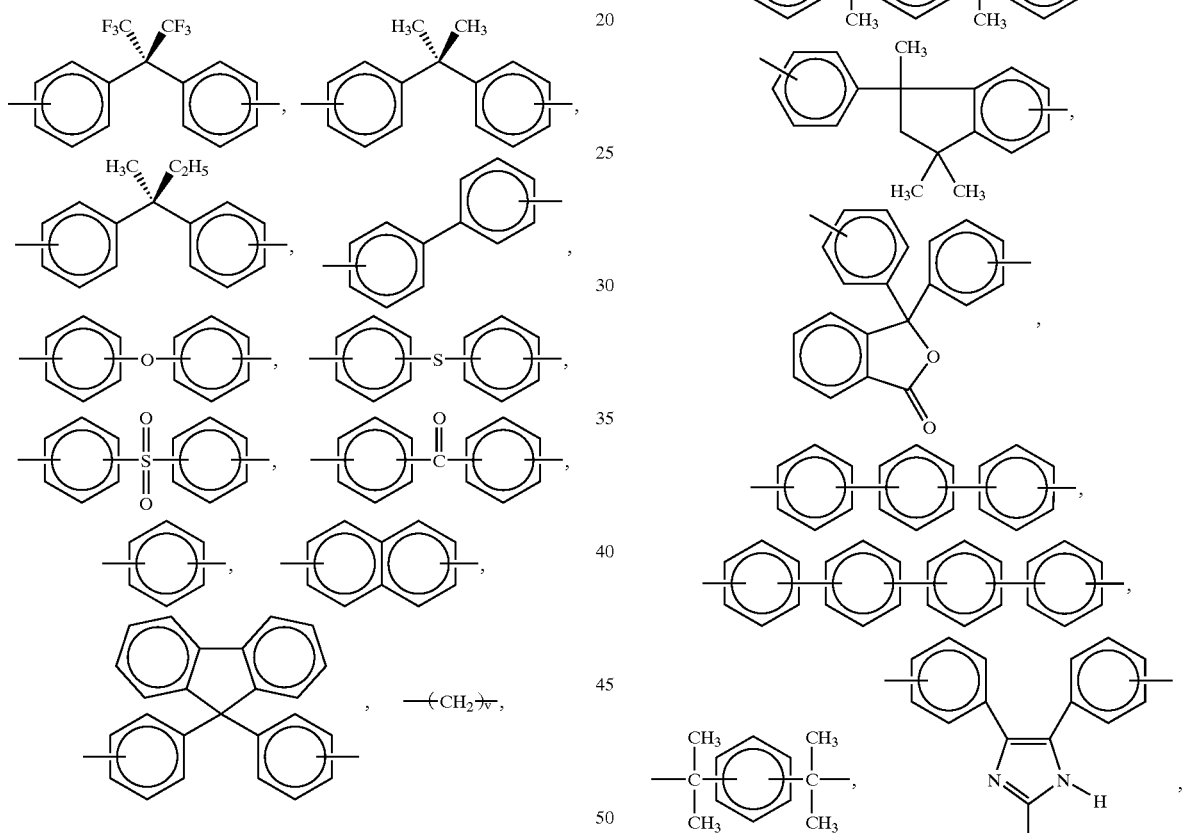
wherein v is an integer of from 1 to about 20,
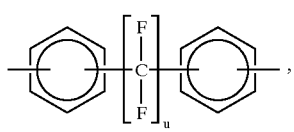
wherein t is an integer of from 1 to about 20,
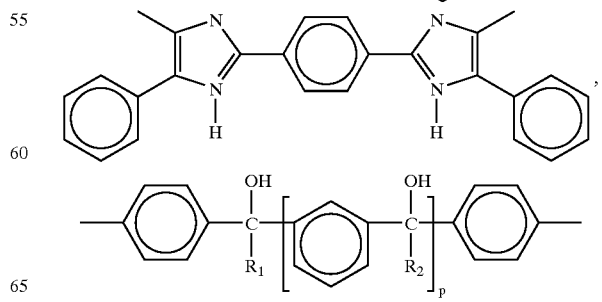
wherein u is an integer of from 1 to about 20, wherein R₁ and R₂ each, independently of the other, are alkyl groups, aryl groups, or mixtures thereof, and p is an integer of 0 or 1,

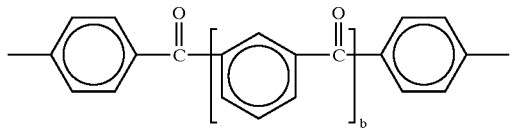

wherein b is an integer of 0 or 1,

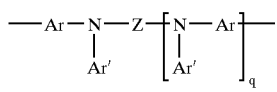

wherein (1) Z is

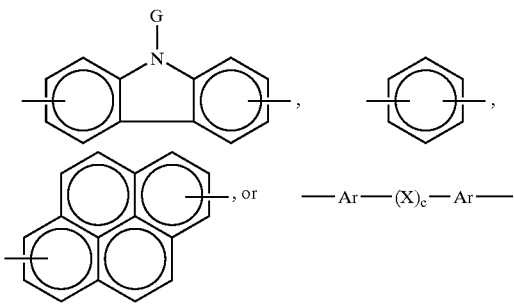

wherein c is 0 or 1; (2) Ar is

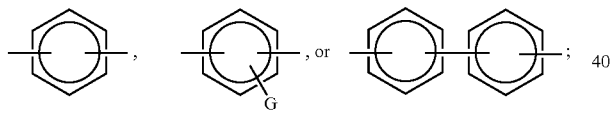

(3) G is an alkyl group selected from alkyl or isoalkyl groups containing from about 2 to about 10 carbon atoms; (4) Ar' is

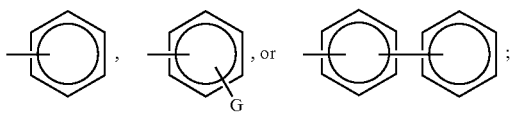

(5) X is

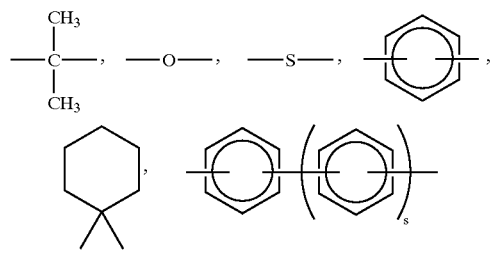

wherein s is 0, 1, or 2,

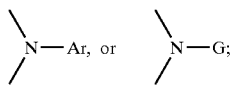

and (6) q is 0 or 1; or mixtures thereof, and n, e, and f are each, independently of the others, integers representing the number of repeating monomer units, wherein e may be 0 and wherein n and f are each at least 1, said process comprising (A) providing a first reaction mixture which comprises (i) a first solvent, (ii) a compound of the formula

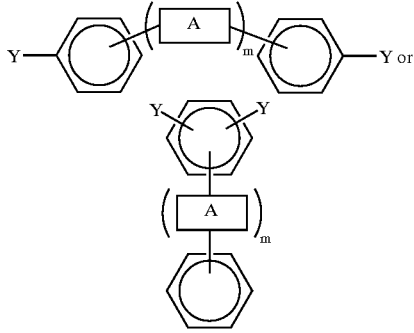

wherein Y is a chlorine atom or a fluorine atom, (iii) a compound of the formula

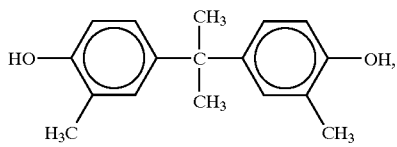

and (iv) optionally, a compound of the formula

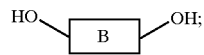

(B) heating the first reaction mixture and removing generated water from the first reaction mixture, thereby effecting a polymerization reaction and forming an intermediate polymer of the formula

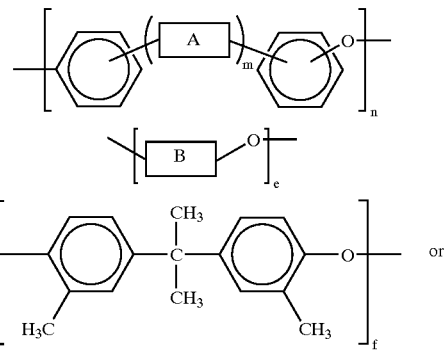

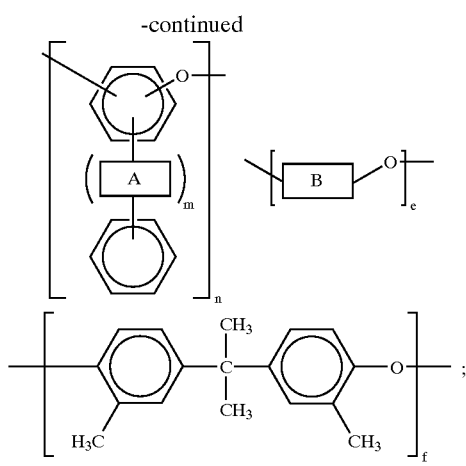

(C) providing a second reaction mixture which comprises (i) a second solvent, (ii) the intermediate polymer, and (iii) a N-halosuccinimide containing a halogen atom, wherein the halogen atom in the N-halosuccinimide is the same as the halogen atom that is X; and (D) heating the second reaction mixture, thereby effecting a polymerization reaction and forming a polymer of the formula

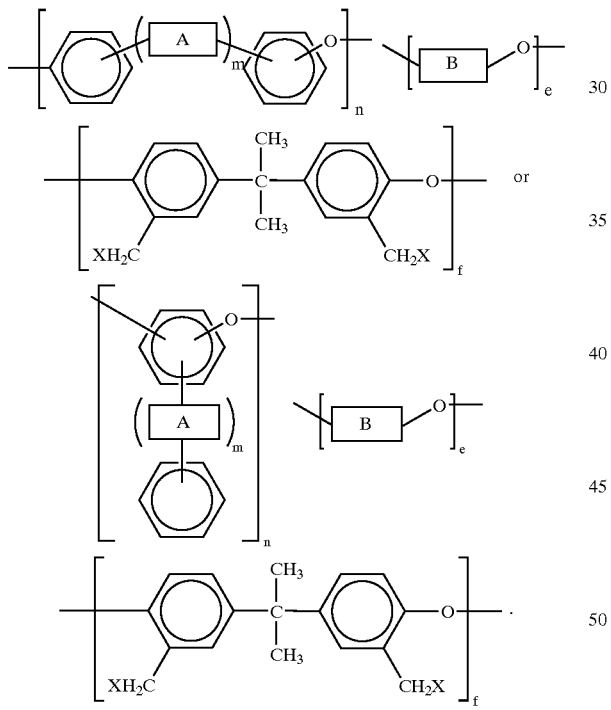

In microelectronics applications, there is a great need for low dielectric constant, high glass transition temperature, thermally stable, photopatternable polymers for use as interlayer dielectric layers and as passivation layers which protect microelectronic circuitry. Poly(imides) are widely used to satisfy these needs; these materials, however, have disadvantageous characteristics such as relatively high water sorption and hydrolytic instability. There is thus a need for high performance polymers which can be effectively photopatterned and developed at high resolution.

Polyarylene ethers are known polymers for use as high performance engineering thermoplastics. They exhibit outstanding physical properties and high chemical resistance. The use of these materials as photoresists when substituted with photoactive substituents is also known. These materials are suitable for use in applications such as thermal ink jet printheads, other microelectronics applications, printed circuit boards, lithographic printing processes, interlayer dielectrics, and the like.

U.S. Pat. No. 5,994,425 (Narang et al.), U.S. Pat. No. 6,022,095 (Narang et al.), EP 827027, and JP 10120743, the disclosures of each of which are totally incorporated herein by reference, disclose an improved composition comprising a photopatternable polymer containing at least some monomer repeat units with photosensitivity-imparting substituents, said photopatternable polymer being of the general formula

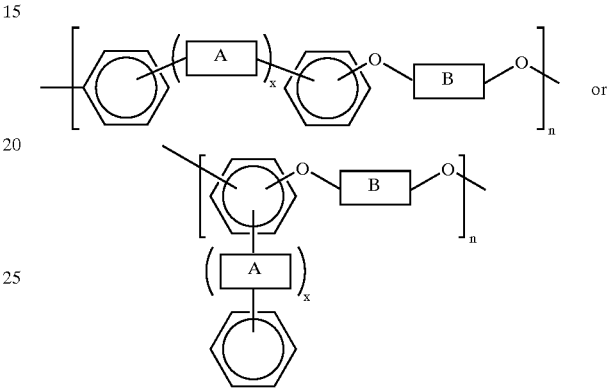

wherein x is an integer of 0 or 1, A is one of several specified groups, such as

B is one of several specified groups, such as

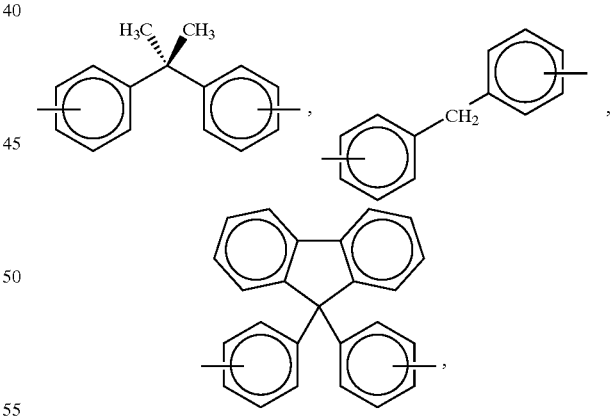

or mixtures thereof, and n is an integer representing the number of repeating monomer units. Also disclosed is a process for preparing a thermal ink jet printhead with the aforementioned polymer and a thermal ink jet printhead containing therein a layer of a crosslinked or chain extended polymer of the above formula.

U.S. Pat. No. 5,849,809 (Narang et al.), U.S. Pat. No. 6,203,143 (Narang et al.), EP 827028, and JP 10090895, the disclosures of each of which are totally incorporated herein by reference, disclose a composition which comprises (a) a polymer containing at least some monomer repeat units with photosensitivity-imparting substituents which enable crosslinking or chain extension of the polymer upon exposure to actinic radiation, said polymer being of the formula

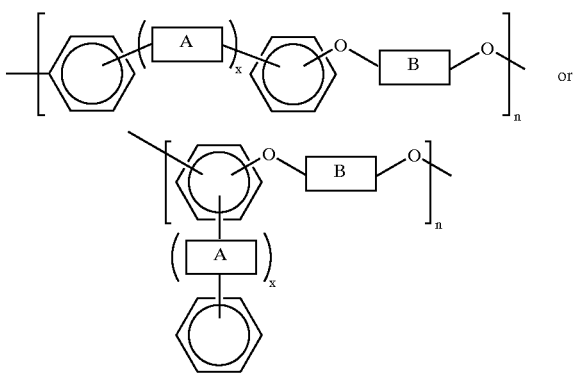

wherein x is an integer of 0 or 1, A is one of several specified groups, such as

B is one of several specified groups, such as

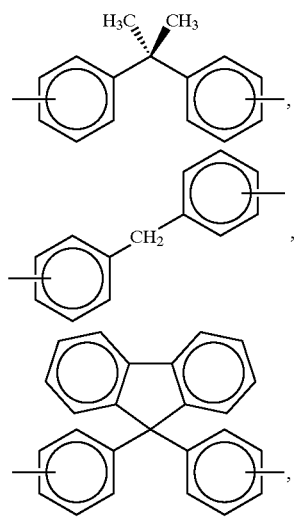

or mixtures thereof, and n is an integer representing the number of repeating monomer units, wherein said photosensitivity-imparting substituents are hydroxyalkyl groups; (b) at least one member selected from the group consisting of photoinitiators and sensitizers; and (c) an optional solvent. Also disclosed are processes for preparing the above polymers and methods of preparing thermal ink jet printheads containing the above polymers.

U.S. Pat. No. 6,124,372 (Smith et al.), U.S. Pat. No. 6,151,042 (Smith et al.), U.S. Pat. No. 6,323,301 (Smith et al.), EP 827029, and JP 10097073, the disclosures of each of which are totally incorporated herein by reference, disclose a composition comprising a polymer with a weight average molecular weight of from about 1,000 to about 100,000, said polymer containing at least some monomer repeat units with a first, photosensitivity-imparting substituent which enables crosslinking or chain extension of the polymer upon exposure to actinic radiation, said polymer also containing a second, thermal sensitivity-imparting substituent which enables further crosslinking or chain extension of the polymer upon exposure to temperatures of about 140° C. and higher, wherein the first substituent is not the same as the second substituent, said polymer being selected from the group consisting of polysulfones, polyphenylenes, polyether sulfones, polyimides, polyamide imides, polyarylene ethers, polyphenylene sulfides, polyarylene ether ketones, phenoxy resins, polycarbonates, polyether imides, polyquinoxalines, polyquinolines, polybenzimidazoles, polybenzoxazoles, polybenzothiazoles, polyoxadiazoles, copolymers thereof, and mixtures thereof.

U.S. Pat. No. 5,889,077 (Fuller et al.), U.S. Pat. No. 6,087,414 (Fuller et al.), EP 827030, and JP 10090894, the disclosures of each of which are totally incorporated herein by reference, disclose a process which comprises reacting a polymer of the general formula

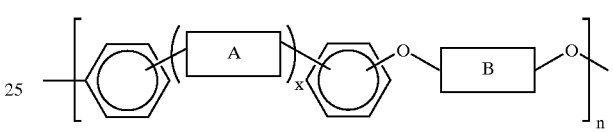

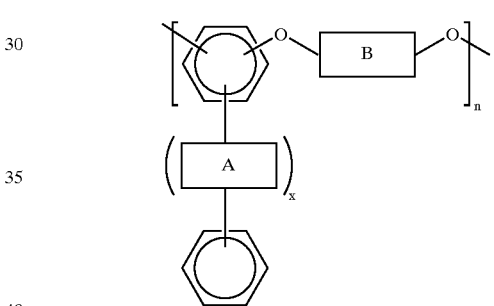

wherein x is an integer of 0 or 1, A is one of several specified groups, such as

B is one of several specified groups, such as

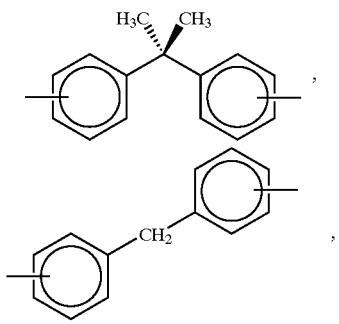

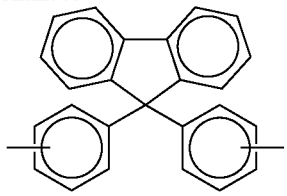

or mixtures thereof, and n is an integer representing the number of repeating monomer units, with (i) a formaldehyde source, and (ii) an unsaturated acid in the presence of an acid catalyst, thereby forming a curable polymer with unsaturated ester groups. Also disclosed is a process for preparing an ink jet printhead with the above polymer.

U.S. Pat. No. 5,739,254 (Fuller et al.), U.S. Pat. No. 5,753,783 (Fuller et al.), EP 826700, and JP 10087817, the disclosures of each of which are totally incorporated herein by reference, disclose a process which comprises reacting a polymer of the general formula

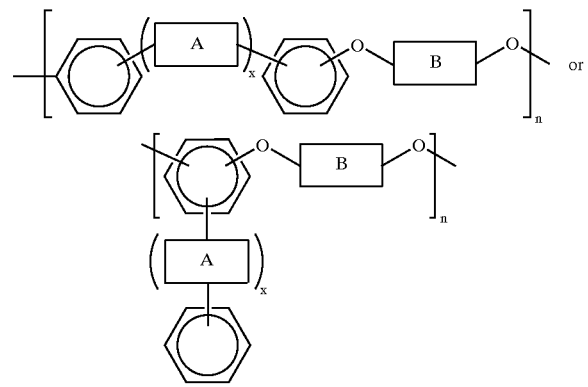

wherein x is an integer of 0 or 1, A is one of several specified groups, such as

B is one of several specified groups, such as

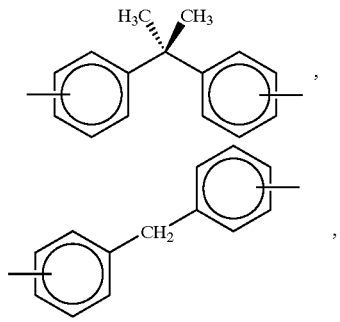

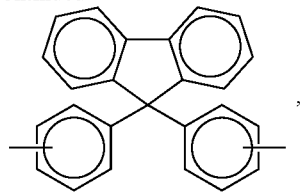

or mixtures thereof, and n is an integer representing the number of repeating monomer units, with an acetyl halide and dimethoxymethane in the presence of a halogen-containing Lewis acid catalyst and methanol, thereby forming a haloalkylated polymer. In a specific embodiment, the haloalkylated polymer is then reacted further to replace at least some of the haloalkyl groups with photosensitivity-imparting groups. Also disclosed is a process for preparing a thermal ink jet printhead with the aforementioned polymer.

U.S. Pat. No. 5,761,809 (Fuller et al.), EP 827026, and JP 10090896, the disclosures of each of which are totally incorporated herein by reference, disclose a process which comprises reacting a haloalkylated aromatic polymer with a material selected from the group consisting of unsaturated ester salts, alkoxide salts, alkylcarboxylate salts, and mixtures thereof, thereby forming a curable polymer having functional groups corresponding to the selected salt. Another embodiment of the present invention is directed to a process for preparing an ink jet printhead with the curable polymer thus prepared.

U.S. Pat. No. 5,958,995 (Narang et al.), U.S. Pat. No. 6,184,263 (Narang et al.), EP 827031, and JP 10104836, the disclosures of each of which are totally incorporated herein by reference, disclose a composition which comprises a mixture of (A) a first component comprising a polymer, at least some of the monomer repeat units of which have at least one photosensitivity-imparting group thereon, said polymer having a first degree of photosensitivity-imparting group substitution measured in milliequivalents of photosensitivity-imparting group per gram and being of the general formula

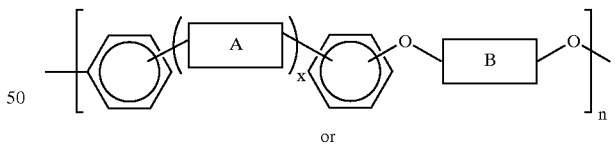

or

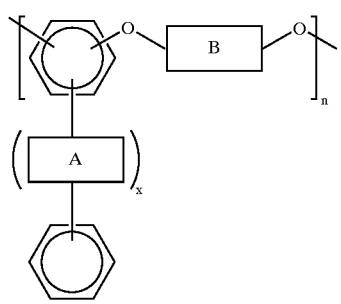

wherein x is an integer of 0 or 1, A is one of several specified groups, such as

B is one of several specified groups, such as

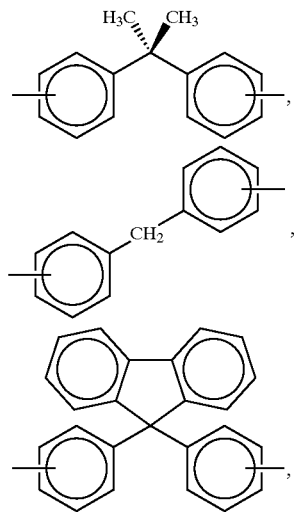

or mixtures thereof, and n is an integer representing the number of repeating monomer units, and (B) a second component which comprises either (1) a polymer having a second degree of photosensitivity-imparting group substitution measured in milliequivalents of photosensitivity-imparting group per gram lower than the first degree of photosensitivity-imparting group substitution, wherein said second degree of photosensitivity-imparting group substitution may be zero, wherein the mixture of the first component and the second component has a third degree of photosensitivity-imparting group substitution measured in milliequivalents of photosensitivity-imparting group per gram which is lower than the first degree of photosensitivity-imparting group substitution and higher than the second degree of photosensitivity-imparting group substitution, or (2) a reactive diluent having at least one photosensitivity-imparting group per molecule and having a fourth degree of photosensitivity-imparting group substitution measured in milliequivalents of photosensitivity-imparting group per gram, wherein the mixture of the first component and the second component has a fifth degree of photosensitivity-imparting group substitution measured in milliequivalents of photosensitivity-imparting group per gram which is higher than the first degree of photosensitivity-imparting group substitution and lower than the fourth degree of photosensitivity-imparting group substitution; wherein the weight average molecular weight of the mixture is from about 10,000 to about 50,000; and wherein the third or fifth degree of photosensitivity-imparting group substitution is from about 0.25 to about 2 milliequivalents of photosensitivity-imparting groups per gram of mixture. Also disclosed is a process for preparing a thermal ink jet printhead with the aforementioned composition.

U.S. Pat. No. 5,945,253 (Narang et al.), U.S. Pat. No. 6,365,323 (Narang et al.), EP 827033, and JP 10090897, the disclosures of each of which are totally incorporated herein by reference, disclose a composition which comprises a polymer containing at least some monomer repeat units with photosensitivity-imparting substituents which enable crosslinking or chain extension of the polymer upon exposure to actinic radiation, said polymer being of the formula

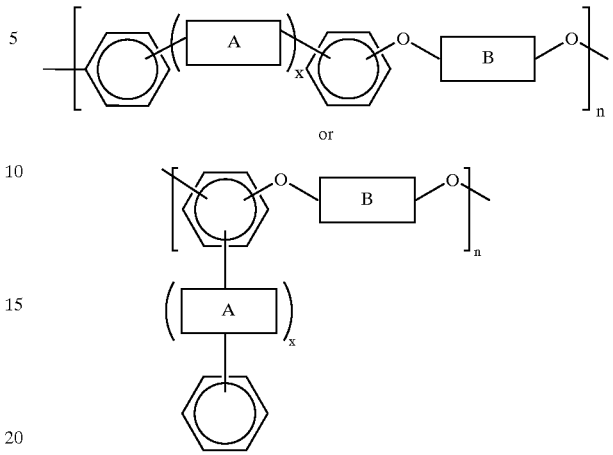

wherein x is an integer of 0 or 1, A is one of several specified groups, such as

B is one of several specified groups, such as

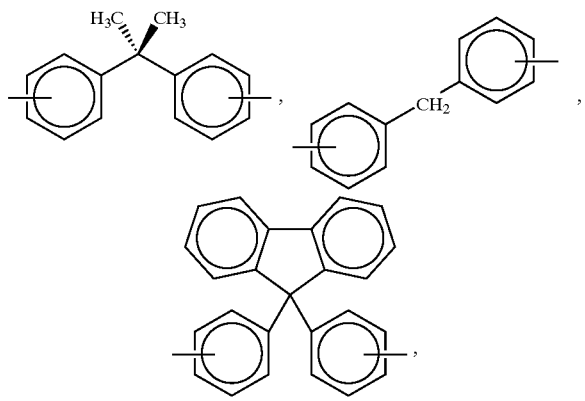

or mixtures thereof, and n is an integer representing the number of repeating monomer units, wherein said photosensitivity-imparting substituents are allyl ether groups, epoxy groups, or mixtures thereof. Also disclosed are a process for preparing a thermal ink jet printhead containing the aforementioned polymers and processes for preparing the aforementioned polymers.

U.S. Pat. No. 5,863,963 (Narang et al.), U.S. Pat. No. 6,090,453 (Narang et al.), and JP 10090899, the disclosures of each of which are totally incorporated herein by reference, disclose a process which comprises the steps of (a) providing a polymer containing at least some monomer repeat units with halomethyl group substituents which enable crosslinking or chain extension of the polymer upon exposure to a radiation source which is electron beam radiation, x-ray radiation, or deep ultraviolet radiation, said polymer being of the formula

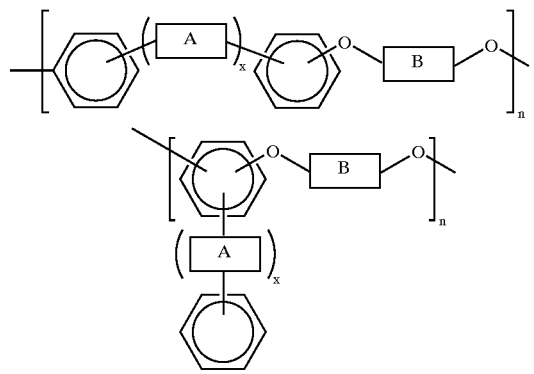

wherein x is an integer of 0 or 1, A is one of several specified groups, such as

B is one of several specified groups, such as

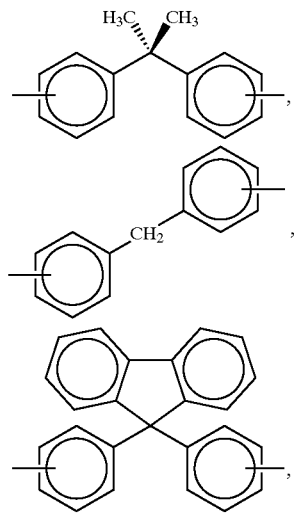

or mixtures thereof, and n is an integer representing the number of repeating monomer units, and (b) causing the polymer to become crosslinked or chain extended through the photosensitivity-imparting groups. Also disclosed is a process for preparing a thermal ink jet printhead by the aforementioned curing process.

U.S. Pat. No. 6,007,877 (Narang et al.), U.S. Pat. No. 6,273,543 (Narang et al.), EP 827032, and JP 10090898, the disclosures of each of which are totally incorporated herein by reference, disclose a composition which comprises a polymer containing at least some monomer repeat units with water-solubility- or water-dispersability-imparting substituents and at least some monomer repeat units with photosensitivity-imparting substituents which enable crosslinking or chain extension of the polymer upon exposure to actinic radiation, said polymer being of the formula

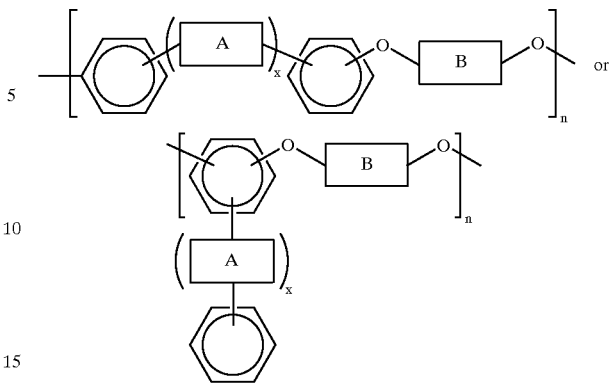

wherein x is an integer of 0 or 1, A is one of several specified groups, such as

B is one of several specified groups, such as

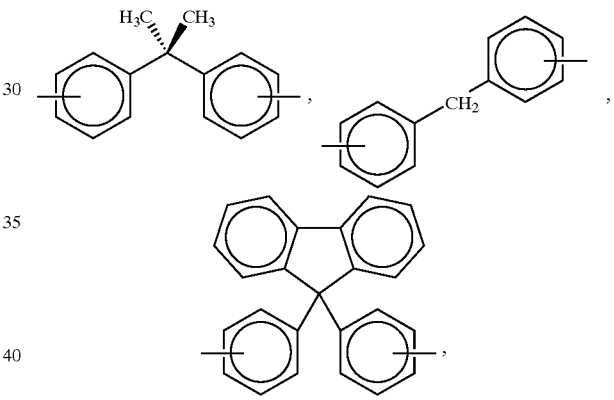

or mixtures thereof, and n is an integer representing the number of repeating monomer units. In one embodiment, a single functional group imparts both photosensitivity and water solubility or dispersability to the polymer. In another embodiment, a first functional group imparts photosensitivity to the polymer and a second functional group imparts water solubility or dispersability to the polymer. Also disclosed is a process for preparing a thermal ink jet printhead with the aforementioned polymers.

U.S. Pat. No. 5,814,426 (Fuller et al.), EP 918257, and JP 11218943, the disclosures of each of which are totally incorporated herein by reference, disclose an imaging member which comprises a conductive substrate, a photogenerating material, and a binder which comprises a polymer of the formulae I, II, III, IV, V, VI, VII, VIII, IX, or X as further defined therein.

U.S. Pat. No. 5,882,814 (Fuller et al.), EP 918256, and JP 11223956, the disclosures of each of which are totally incorporated herein by reference, disclose an imaging member which comprises a conductive substrate, a photogenerating layer, and a charge transport layer comprising a polymer of the formulae I, II, III, IV, V, VI, VII, VIII, IX, or X as further defined therein.

U.S. Pat. No. 5,874,192 (Fuller et al.), EP 918258, and JP 11223955, the disclosures of each of which are totally incorporated herein by reference, disclose an imaging member which comprises a conductive substrate, a photogenerating material, a charge transport material, and a polymeric binder comprising (a) a first polymer comprising a polycarbonate, and (b) a second polymer of the formulae I, II, III, IV, V, VI, VII, VIII, IX, or X as further defined therein.

U.S. Pat. No. 6,273,985 (DeLouise et al.), the disclosure of which is totally incorporated herein by reference, discloses a process for bonding a first article to a second article which comprises (a) providing a first article comprising a polymer having photosensitivity-imparting substituents; (b) providing a second article comprising metal, plasma nitride, silicon, or glass; (c) applying to at least one of the first article and the second article an adhesion promoter selected from silanes, titanates, or zirconates having (i) alkoxy, aryloxy, or arylalkyloxy functional groups and (ii) functional groups including at least one photosensitive aliphatic >C=C< linkage; (d) placing the first article in contact with the second article; and (e) exposing the first article, second article, and adhesion promoter to radiation, thereby bonding the first article to the second article with the adhesion promote. In one embodiment of the present invention, the adhesion promoter is employed in microelectrical mechanical systems such as thermal ink jet printheads.

U.S. Pat. No. 6,260,956 (Narang et al.), the disclosure of which is totally incorporated herein by reference, discloses an ink jet printhead which comprises (i) an upper substrate with a set of parallel grooves for subsequent use as ink channels and a recess for subsequent use as a manifold, the grooves being open at one end for serving as droplet emitting nozzles, and (ii) a lower substrate in which one surface thereof has an array of heating elements and addressing electrodes formed thereon, said lower substrate having an insulative layer deposited on the surface thereof and over the heating elements and addressing electrodes and patterned to form recesses therethrough to expose the heating elements and terminal ends of the addressing electrodes, the upper and lower substrates being aligned, mated, and bonded together to form the printhead with the grooves in the upper substrate being aligned with the heating elements in the lower substrate to form droplet emitting nozzles, said upper substrate comprising a material formed by crosslinking or chain extending a polymer of formula I or II.

U.S. Pat. No. 6,117,967 (Fuller et al.) and JP 200119761, the disclosures of each of which are totally incorporated herein by reference, discloses a polymer of the formula

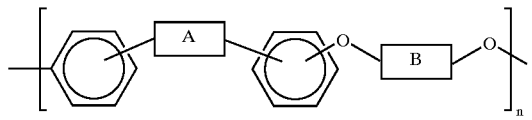

wherein A is

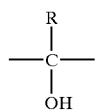

or a mixture of

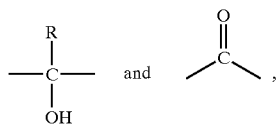

wherein R is a hydrogen atom, an alkyl group, an aryl group, or mixtures thereof, B is one of specified groups, such as

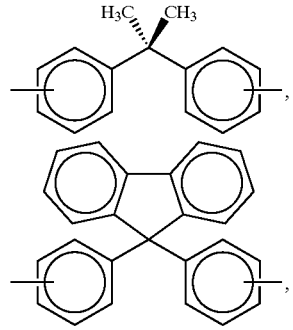

or mixtures thereof, and n is an integer representing the number of repeating monomer units.

U.S. Pat. No. 6,177,238 (Fuller et al.), the disclosure of which is totally incorporated herein by reference, discloses an ink jet printhead containing a polymer of the formula

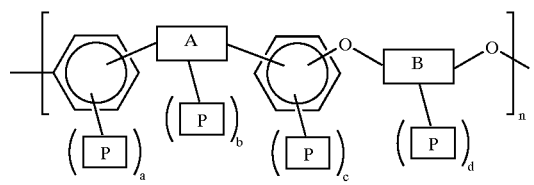

wherein P is a substituent which enables crosslinking of the polymer, a, b, c, and d are each integers of 0, 1, 2, 3, or 4, provided that at least one of a, b, c, and d is equal to or greater than 1 in at least some of the monomer repeat units of the polymer, A is

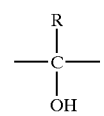

or a mixture of

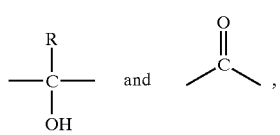

wherein R is a hydrogen atom, an alkyl group, an aryl group, or mixtures thereof, B is one of specified groups, such as

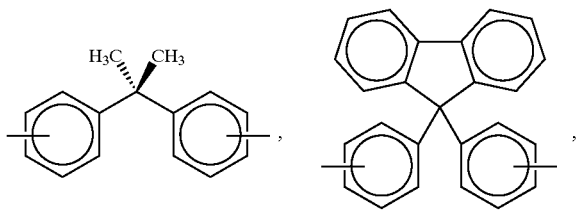

or mixtures thereof, and n is an integer representing the number of repeating monomer units.

U.S. Pat. No. 6,174,636 (Fuller et al.), the disclosure of which is totally incorporated herein by reference, discloses an imaging member which comprises a conductive substrate, a photogenerating material, and a binder comprising a polymer of the formula

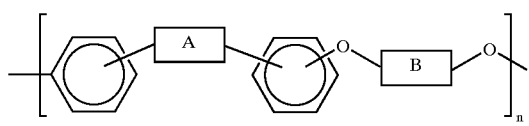

wherein A is

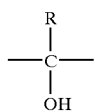

or a mixture of

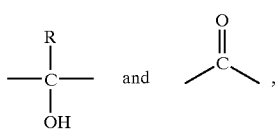

wherein R is a hydrogen atom, an alkyl group, an aryl group, or mixtures thereof, B is one of specified groups, such as

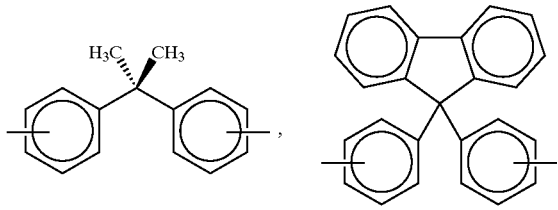

or mixtures thereof, and n is an integer representing the number of repeating monomer units.

U.S. Pat. No. 6,187,512 (Foucher et al.) and JP 2000344884, the disclosures of each of which are totally incorporated herein by reference, disclose a process which comprises reacting a polymer of the general formula

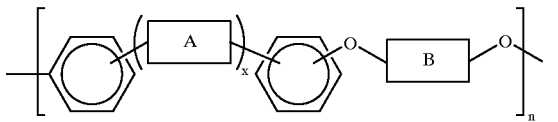

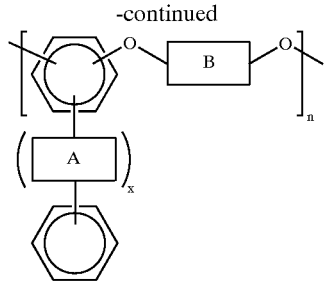

wherein x is an integer of 0 or 1, A is one of several specified groups, such as

B is one of several specified groups, such as

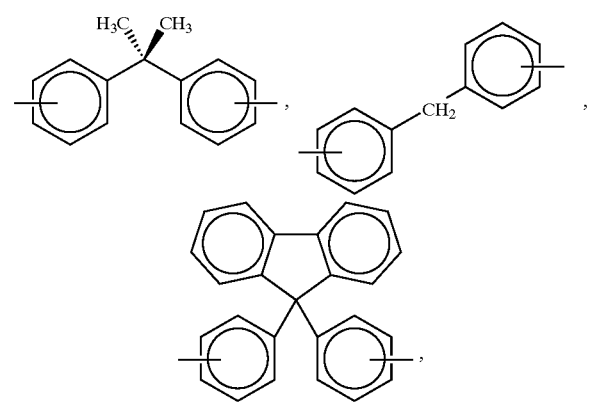

or mixtures thereof, and n is an integer representing the number of repeating monomer units, with a halomethyl alkyl ether, an acetyl halide, and methanol in the presence of a halogen-containing Lewis acid catalyst, thereby forming a halomethylated polymer.

U.S. Pat. No. 6,020,119 (Foucher et al.), the disclosure of which is totally incorporated herein by reference, discloses a process which comprises reacting a polymer of the general formula

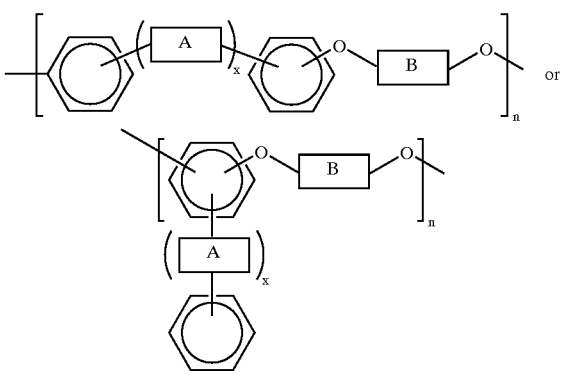

wherein x is an integer of 0 or 1, A is one of several specified groups, such as

B is one of several specified groups, such as

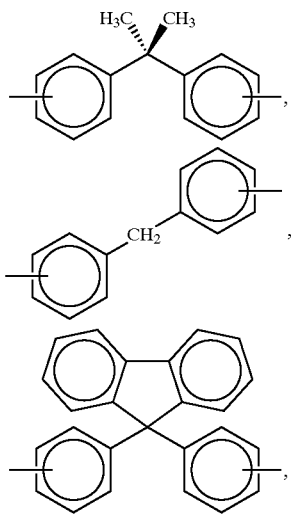

or mixtures thereof, and n is an integer representing the number of repeating monomer units, with a halomethylethyl ether, a hydrohalic acid, and acetic acid in the presence of a halogen-containing Lewis acid catalyst, thereby forming a halomethylated polymer.

U.S. Pat. No. 6,139,920 (Smith et al.) and U.S. Pat. No. 6,260,949 (Smith et al.), the disclosures of each of which are totally incorporated herein by reference, disclose a composition comprising a blend of (a) a thermally reactive polymer selected from the group consisting of resoles, novolacs, thermally reactive polyarylene ethers, and mixtures thereof; and (b) a photoreactive epoxy resin that is photoreactive in the absence of a photocationic initiator.

U.S. Pat. No. 5,773,553 (Fuller et al.) and U.S. Pat. No. 5,869,595 (Fuller et al.), the disclosures of each of which are totally incorporated herein by reference, disclose a process which comprises reacting a polyimide precursor with a borane. Also disclosed is a thermal ink jet printhead containing a layer comprising the product of this reaction.

U.S. Pat. No. 5,939,206 (Kneezel et al.) and JP 10100410, the disclosures of each of which are totally incorporated herein by reference, disclose an apparatus which comprises at least one semiconductor chip mounted on a substrate, said substrate comprising a porous, electrically conductive member having electrophoretically deposited thereon a coating of a polymeric material. In one embodiment, the semiconductor chips are thermal ink jet printhead subunits.

While known compositions and processes are suitable for their intended purposes, a need remains for improved materials suitable for microelectronics applications. A need also remains for photopatternable polymeric materials which are heat stable, electrically insulating, and mechanically robust. Further, a need remains for photopatternable polymeric materials which exhibit low shrinkage during post-cure steps in microelectronic device fabrication processes. In addition, a need remains for photopatternable polymeric materials which exhibit a relatively long shelf life. There is also a need for photopatternable polymeric materials which can be patterned with relatively low photo-exposure energies. In addition, there is a need for photopatternable polymeric materials which, in the cured form, exhibit good solvent resistance. Further, there is a need for photopatternable polymeric materials which, when applied to microelectronic devices by spin casting techniques and cured, exhibit reduced edge bead and no apparent lips and dips. Additionally, there is a need for processes for preparing photopatternable polymeric materials with high aspect ratios at high resolutions by the incorporation of polymerizable groups and/or cross-linking sites pendant to the polymers. A need also remains for processes for preparing photopatternable polymers having halomethyl groups pendant to the polymer chains. In addition, a need remains for processes for preparing photopatternable polymeric materials, said processes being desirable for reasons of safety and nontoxicity. Further, a need remains for processes for preparing photopatternable polymeric materials, said processes enabling reduced costs. Additionally, a need remains for processes for preparing photopatternable polymeric materials that allow for flexibility in the physical properties of the resulting polymeric materials.

SUMMARY OF THE INVENTION

The present invention is directed to a process for preparing a polymer of the formula

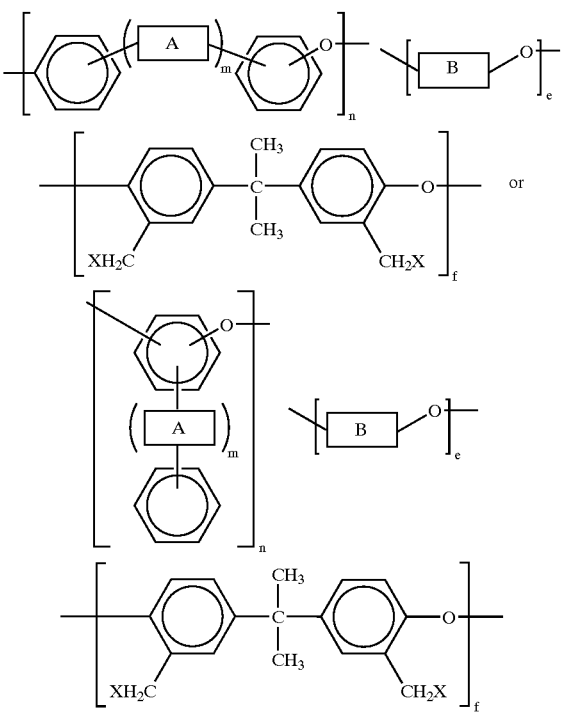

wherein m is an integer of 0 or 1, X is a halogen atom which is chlorine, bromine, or iodine, A is

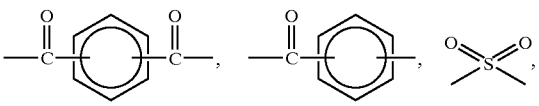

-continued
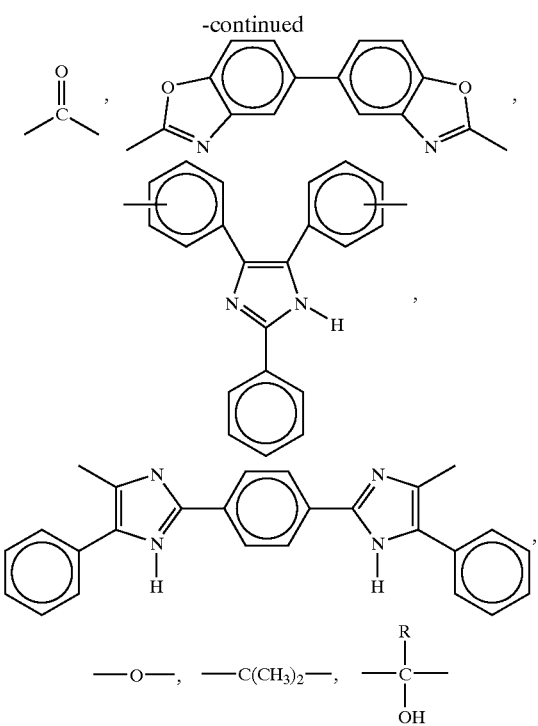
wherein R is an alkyl group, an aryl group, or mixtures thereof,
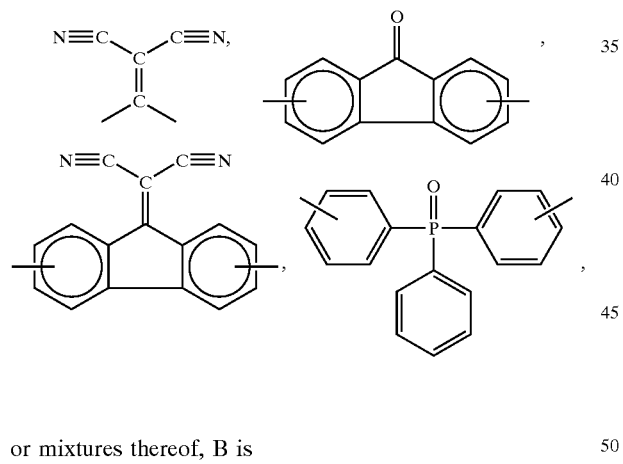
or mixtures thereof, B is
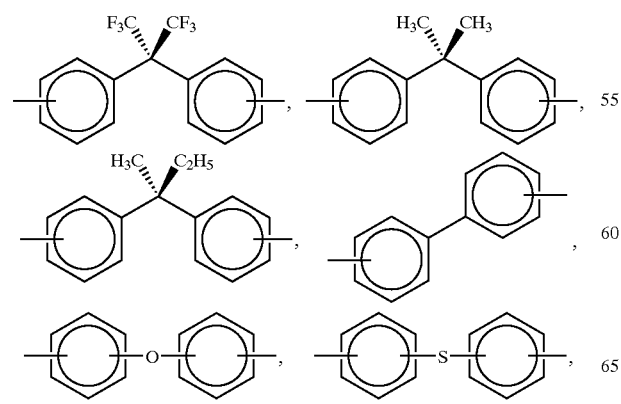
-continued
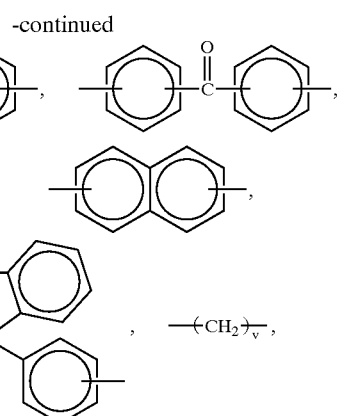
wherein v is an integer of from 1 to about 20,
$-(CH_2O)_t-$
wherein t is an integer of from 1 to about 20,
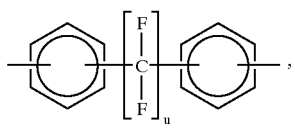
wherein u is an integer of from 1 to about 20,
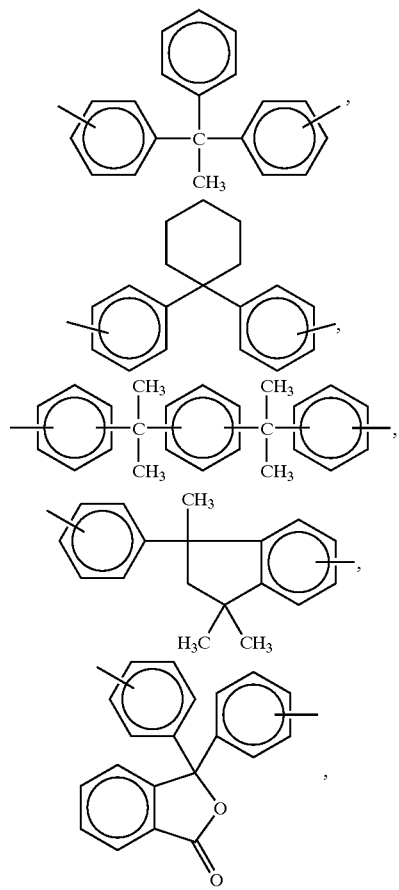

wherein c is 0 or 1; (2) Ar is

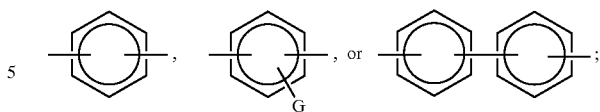

(3) G is an alkyl group selected from alkyl or isoalkyl groups containing from about 2 to about 10 carbon atoms; (4) Ar' is

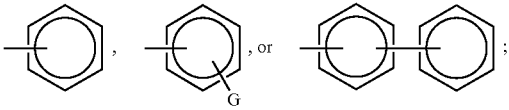

(5) X is

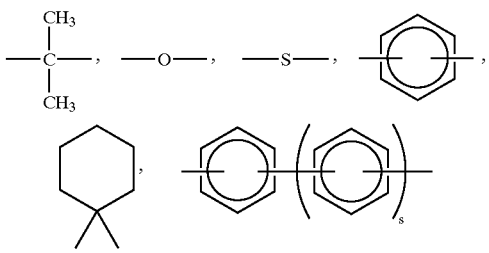

wherein s is 0, 1, or 2,

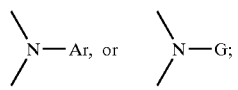

and (6) q is 0 or 1; or mixtures thereof, and n, e, and f are each, independently of the others, integers representing the number of repeating monomer units, wherein e may be 0 and wherein n and f are each at least 1, said process comprising (A) providing a first reaction mixture which comprises (i) a first solvent, (ii) a compound of the formula

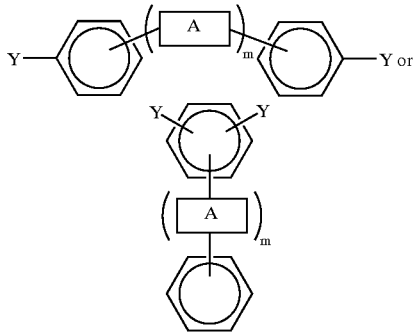

wherein Y is a chlorine atom or a fluorine atom, (iii) a compound of the formula

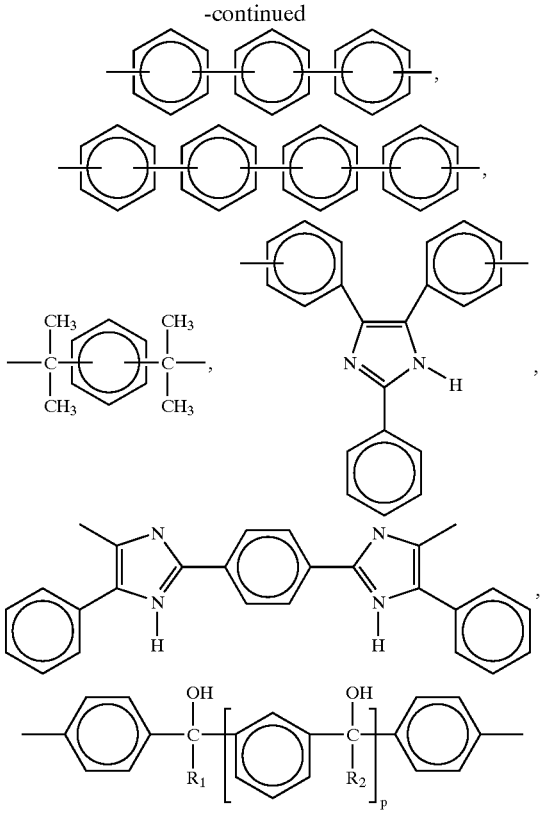

wherein $R_1$ and $R_2$ each, independently of the other, are alkyl groups, aryl groups, or mixtures thereof, and p is an integer of 0 or 1,

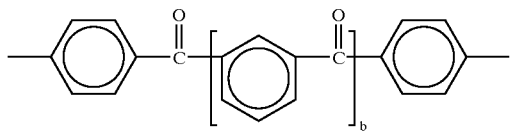

wherein b is an integer of 0 or 1,

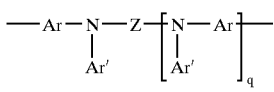

wherein (1) Z is

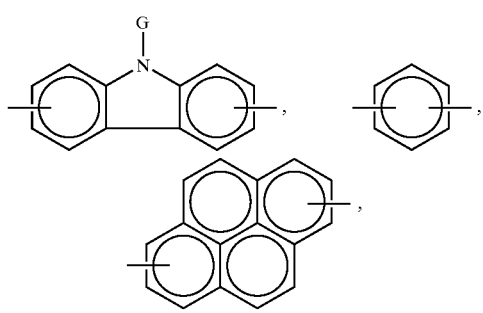

or

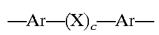

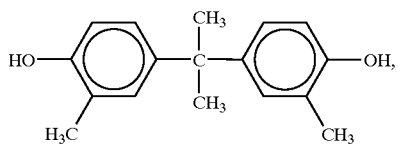

and (iv) optionally, a compound of the formula

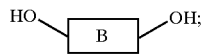

(B) heating the first reaction mixture and removing generated water from the first reaction mixture, thereby effecting a polymerization reaction and forming an intermediate polymer of the formula

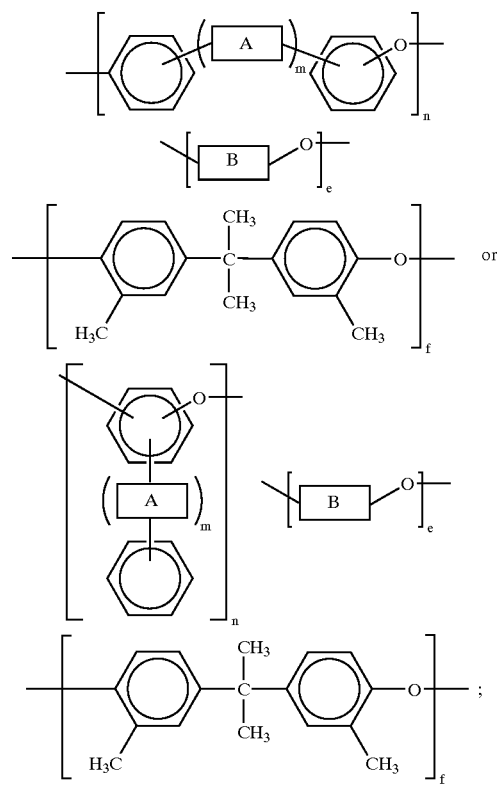

(C) providing a second reaction mixture which comprises (i) a second solvent, (ii) the intermediate polymer, and (iii) a N-halosuccinimide containing a halogen atom, wherein the halogen atom in the N-halosuccinimide is the same as the halogen atom that is X; and (D) heating the second reaction mixture, thereby effecting a polymerization reaction and forming a polymer of the formula

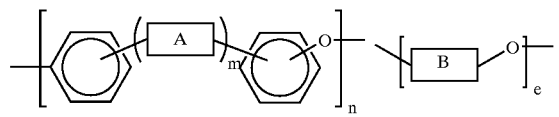

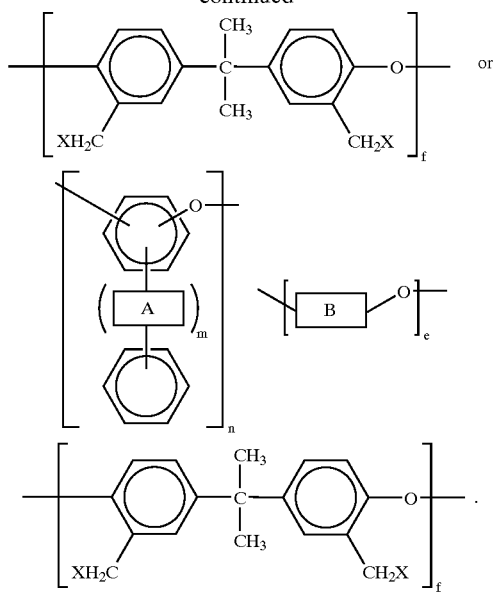

DETAILED DESCRIPTION OF THE INVENTION

The present invention is directed to a process for preparing a polymer of the formula

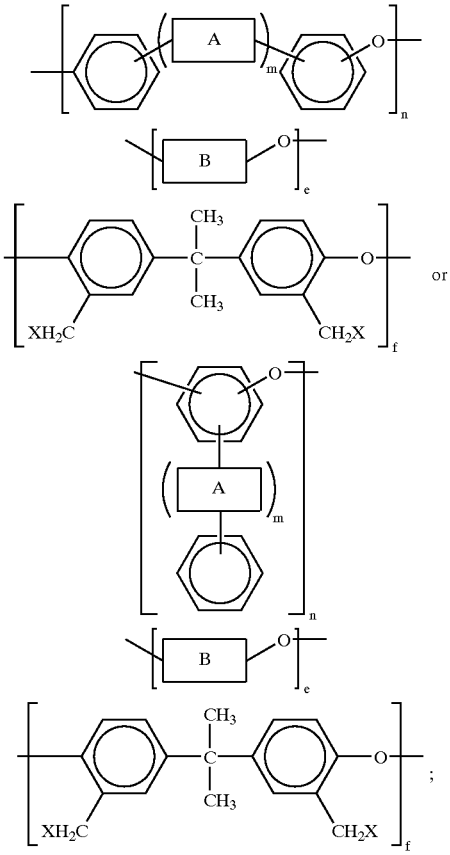

wherein m is an integer of 0 or 1, X is a halogen atom which is chlorine, bromine, or iodine, A is

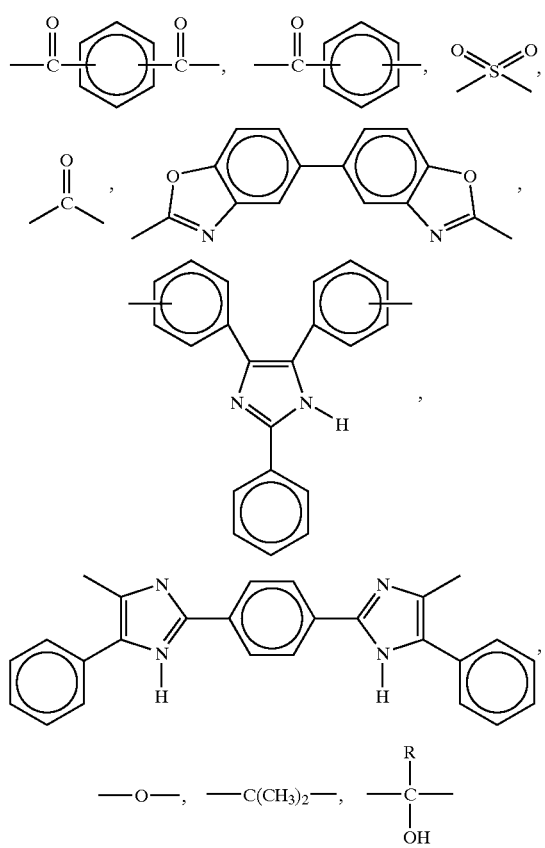

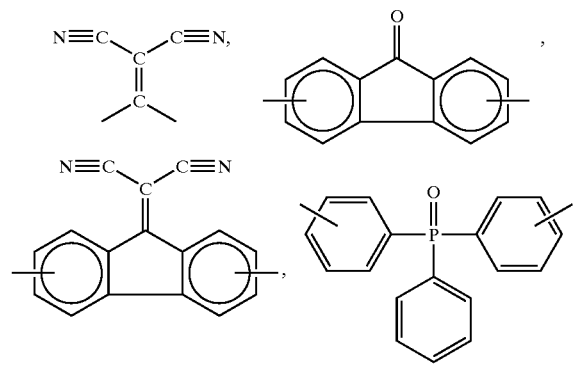

wherein R is an alkyl group (including substituted alkyl groups, with examples of substituents including but not being limited to hydroxy or the like), typically with from 1 to about 20 carbon atoms, preferably with from 1 to about 10 carbon atoms, and more preferably with from 1 to about 5 carbon atoms, although the number of carbon atoms can be outside of this range, an aryl group (including substituted aryl groups, with examples of substituents including but not being limited to hydroxy or the like), typically with from 6 to about 18 carbon atoms, preferably with from 6 to about 12 carbon atoms, and more preferably with 6 carbon atoms, although the number of carbon atoms can be outside of this range, or mixtures thereof, or mixtures thereof, B is

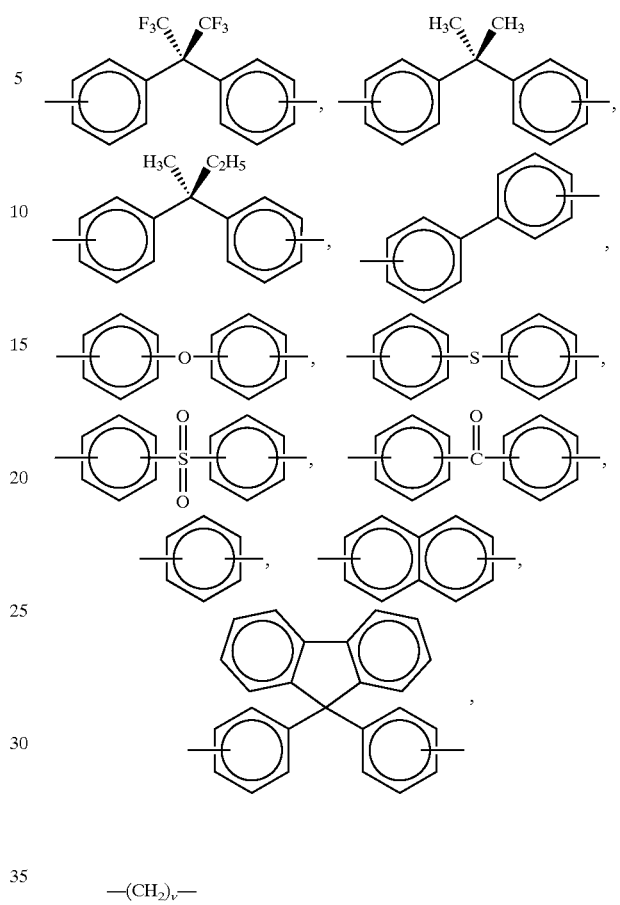

wherein v is an integer of from 1 to about 20,

—(CH$_2$O)$_t$— wherein t is an integer of from 1 to about 20,

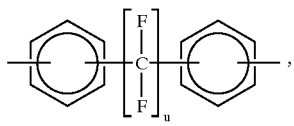

wherein u is an integer of from 1 to about 20,

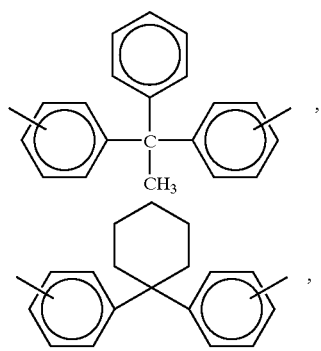

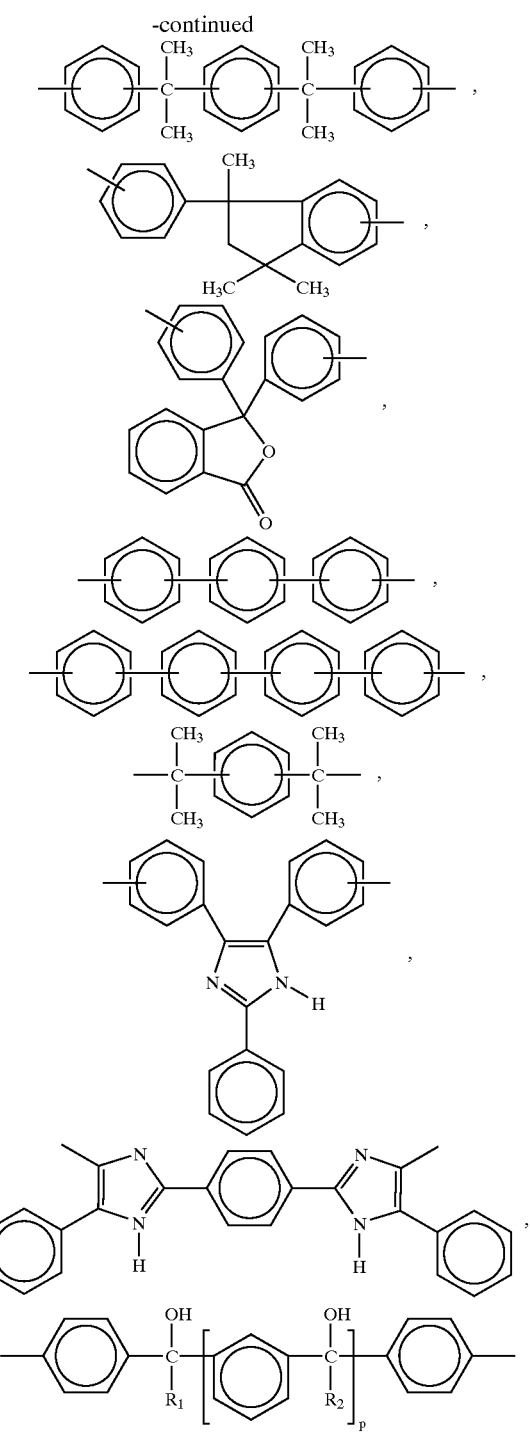
wherein $R_1$ and $R_2$ each, independently of the other, are alkyl groups, aryl groups, or mixtures thereof, and p is an integer of 0 or 1,
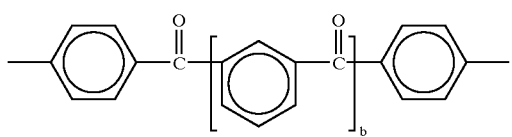
wherein b is an integer of 0 or 1,
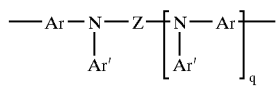
wherein (1) Z is
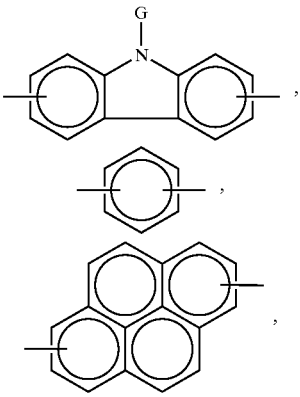
or
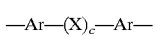
wherein c is 0 or 1; (2) Ar is
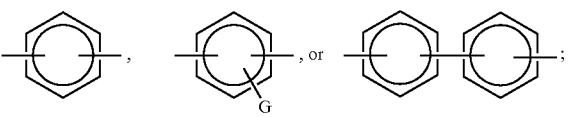
(3) G is an alkyl group selected from alkyl or isoalkyl groups containing from about 2 to about 10 carbon atoms; (4) Ar' is
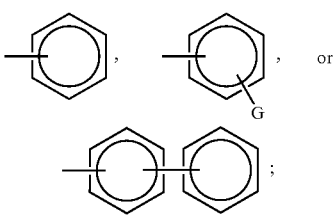
(5) X is
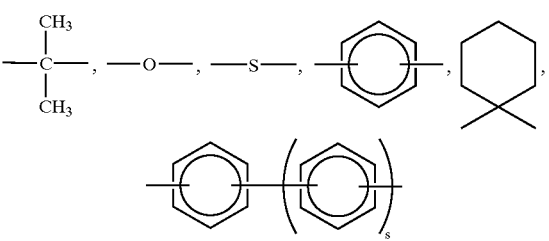

wherein s is 0, 1, or 2,

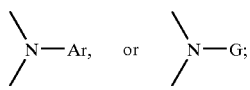

and (6) q is 0 or 1; or mixtures thereof, and n, e, and f are each, independently of the others, integers representing the number of repeating monomer units, wherein e may be 0 and wherein n and f are each at least 1, said process comprising (A) providing a first reaction mixture which comprises (i) a first solvent, (ii) a compound of the formula

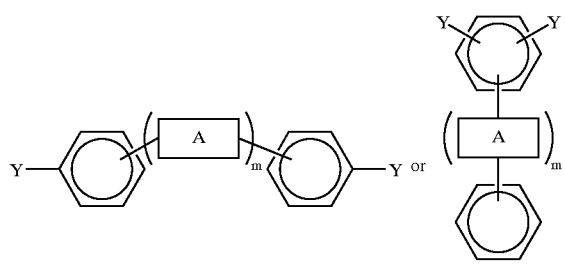

wherein Y is a chlorine atom or a fluorine atom, (iii) a compound of the formula

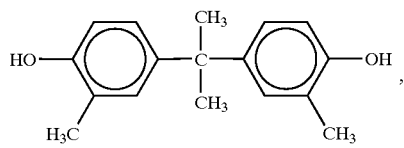

and (iv) optionally, a compound of the formula

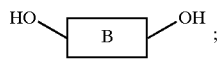

(B) heating the first reaction mixture and removing generated water from the first reaction mixture, thereby effecting a polymerization reaction and forming an intermediate polymer of the formula

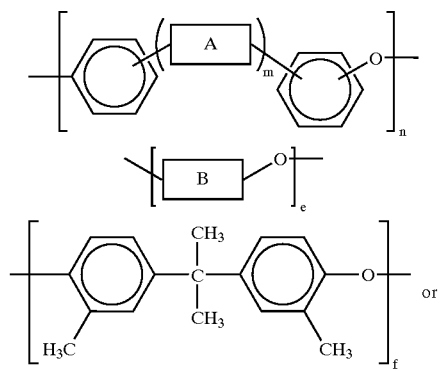

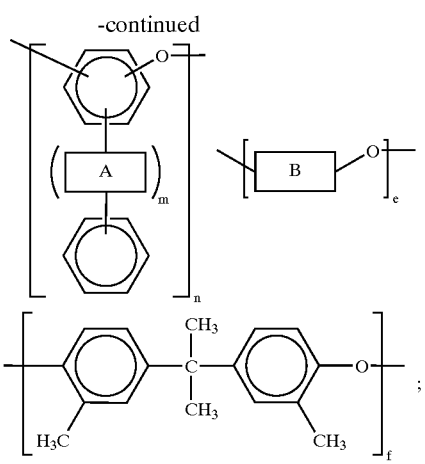

(C) providing a second reaction mixture which comprises (i) a second solvent, (ii) the intermediate polymer, and (iii) a N-halosuccinimide containing a halogen atom, wherein the halogen atom in the N-halosuccinimide is the same as the halogen atom that is X; and (D) heating the second reaction mixture, thereby effecting a polymerization reaction and forming a polymer of the formula

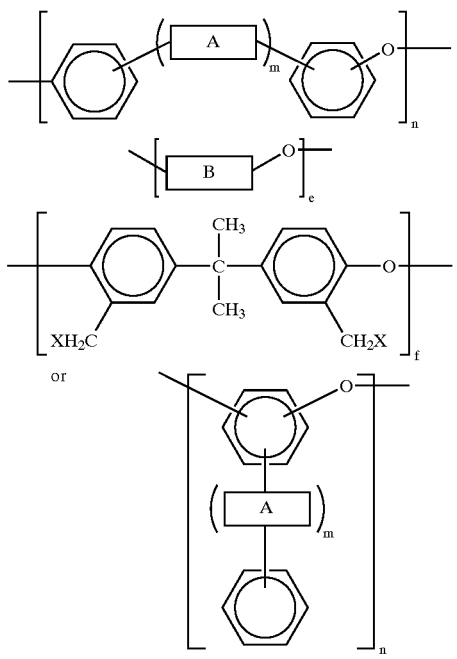

In the polymers of the above formulae, the phenyl groups and the A groups can also be substituted. Substituents can be placed thereon either prior to or subsequent to polymerization.

In the polymers of the above formula, X can also be a mixture of two or more of chlorine, bromine, or iodine.

Polymers of this kind can be prepared by using a mixture of N-halosuccinimide reactants with two or more different halogen atoms therein.

In the material of the formula

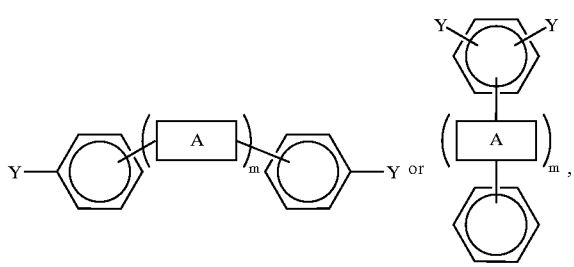

m and "A" are as defined for the resulting polymer composition as set forth hereinabove. Specific examples of suitable materials of this formula include 4,4'-difluorobenzophenone, of the formula

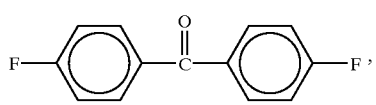

4,4'-dichlorobenzophenone, of the formula

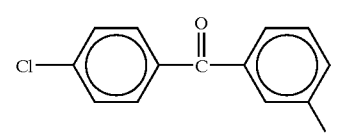

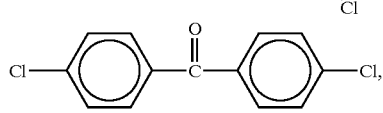

3,4'-difluorobenzophenone, of the formula

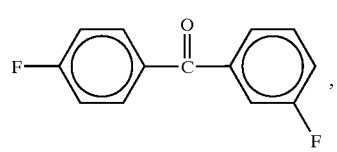

3,4'-dichlorobenzophenone, of the formula

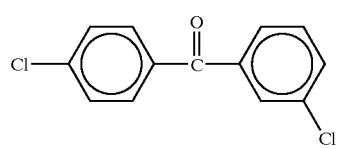

3,3'-difluorobenzophenone, of the formula

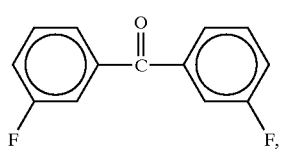

3,3'-dichlorobenzophenone, of the formula

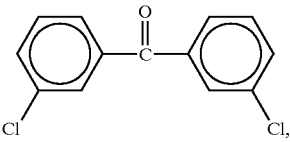

2,4'-difluorobenzophenone, of the formula

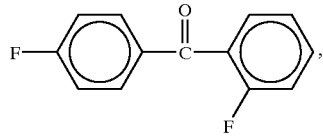

2,4'-dichlorobenzophenone, of the formula

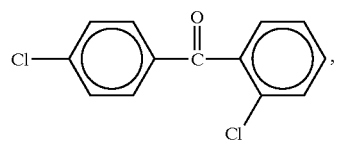

2,3'-difluorobenzophenone, of the formula

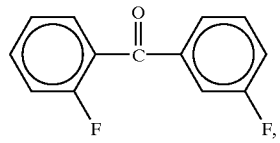

2,3'-dichlorobenzophenone, of the formula

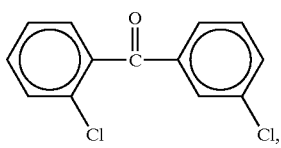

2,2'-difluorobenzophenone, of the formula

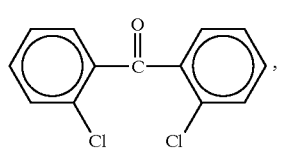

2,2'-dichlorobenzophenone, of the formula compounds of the formulae
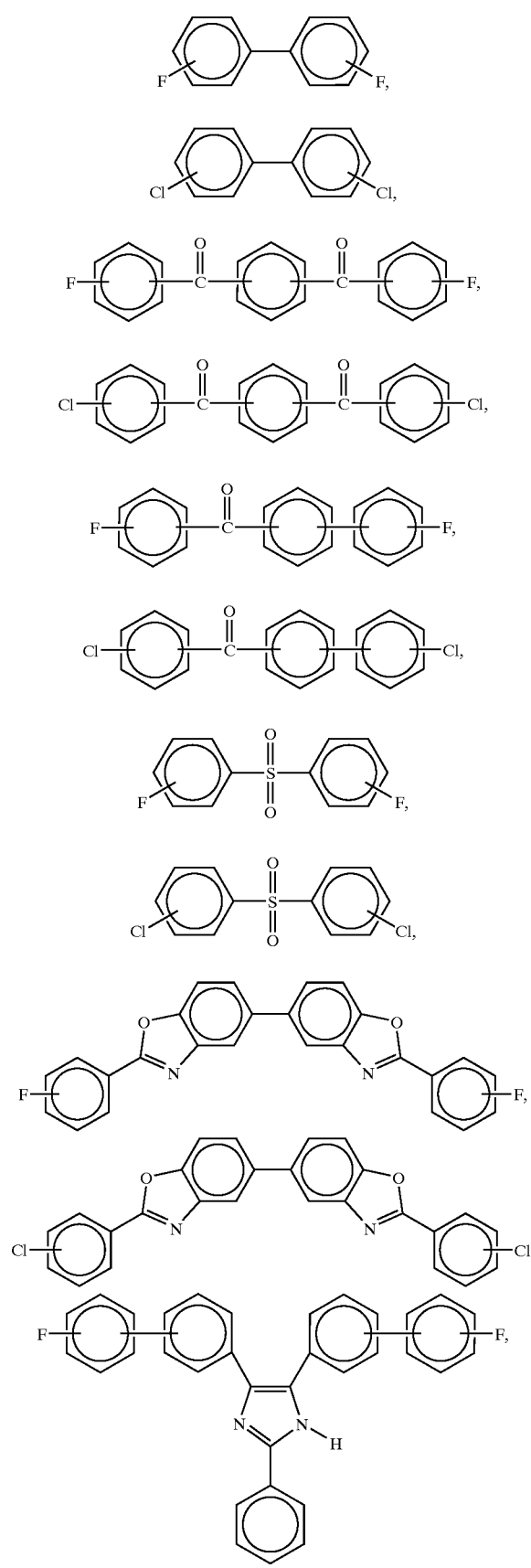
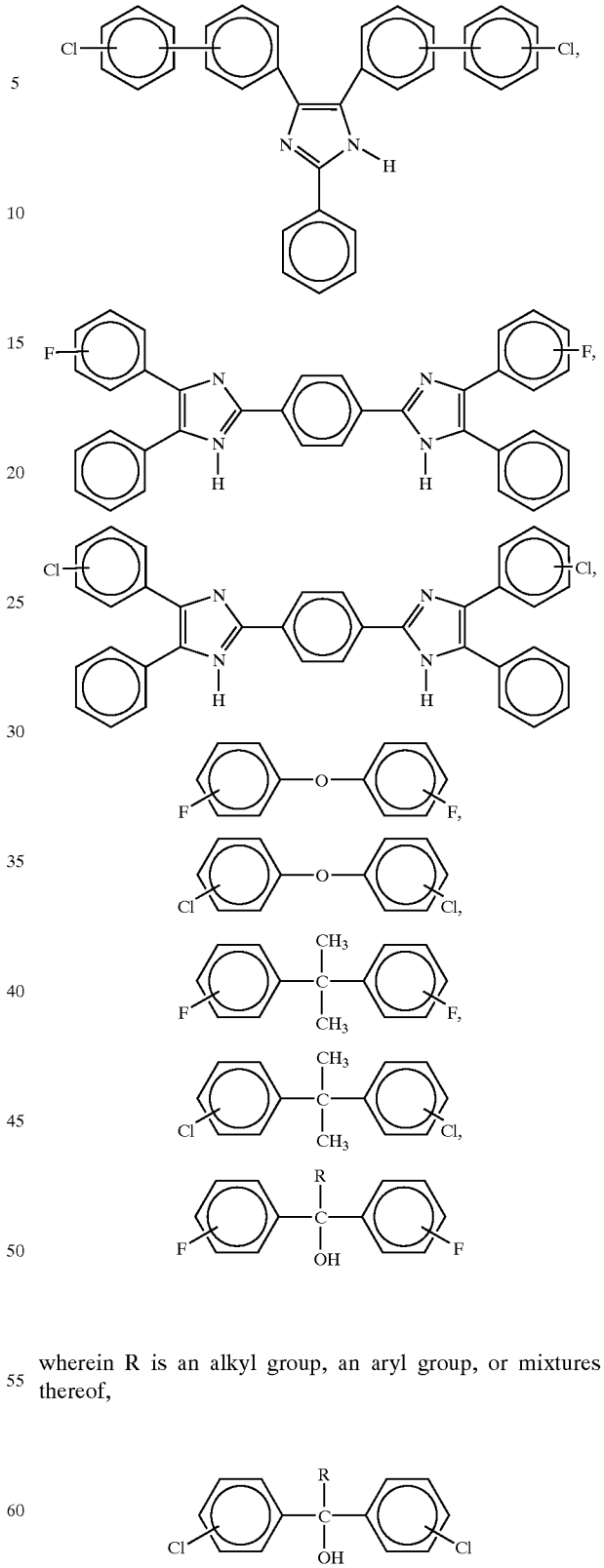
wherein R is an alkyl group, an aryl group, or mixtures thereof,
wherein R is an alkyl group, an aryl group, or mixtures thereof,

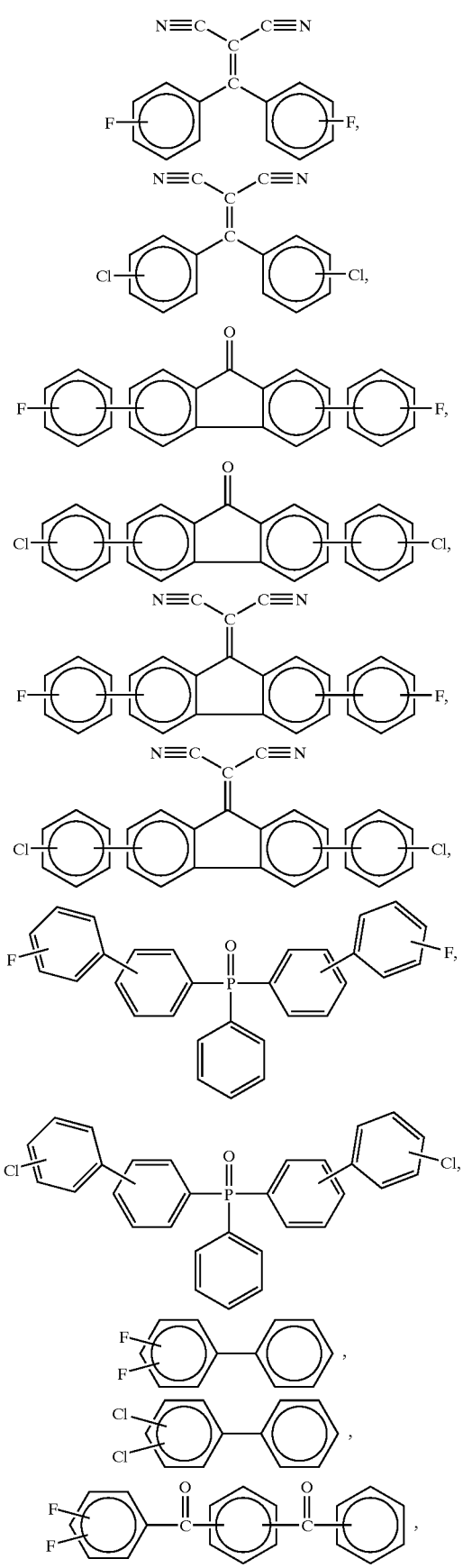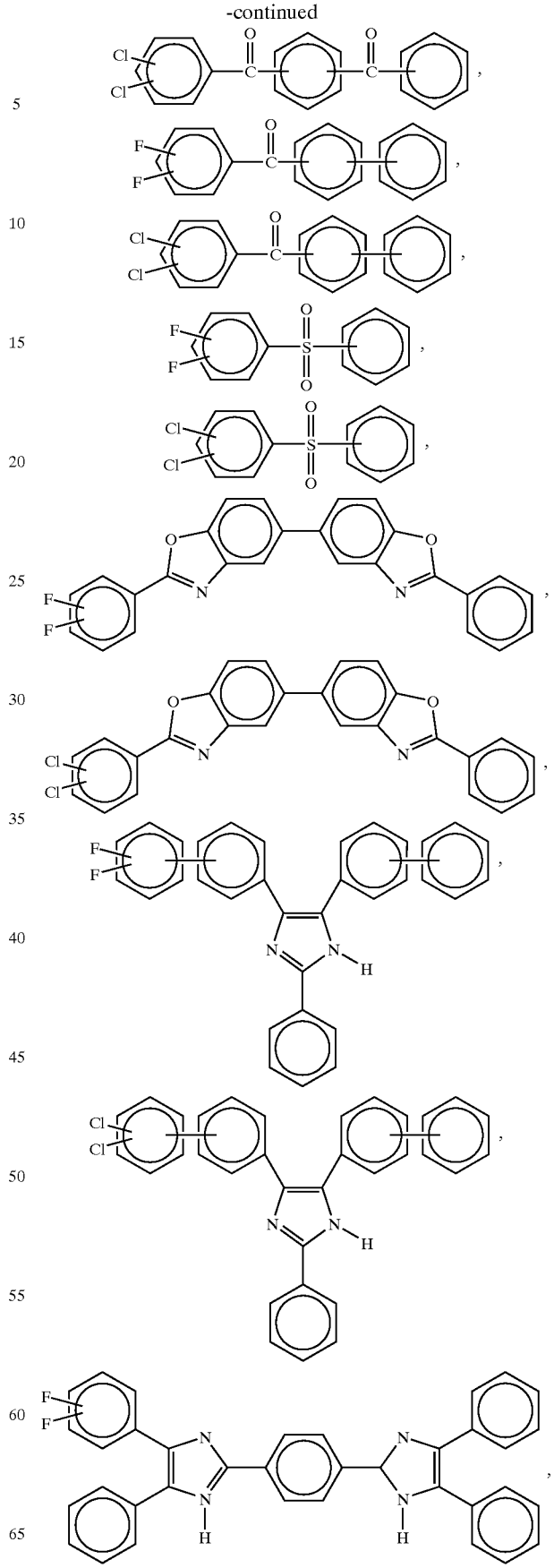

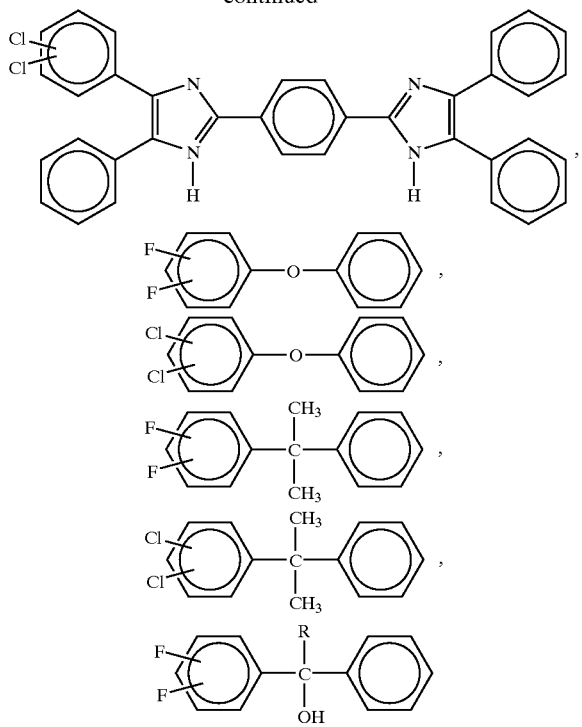

wherein R is a an alkyl group, an aryl group, or mixtures thereof,

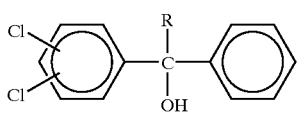

wherein R is a an alkyl group, an aryl group, or mixtures thereof,

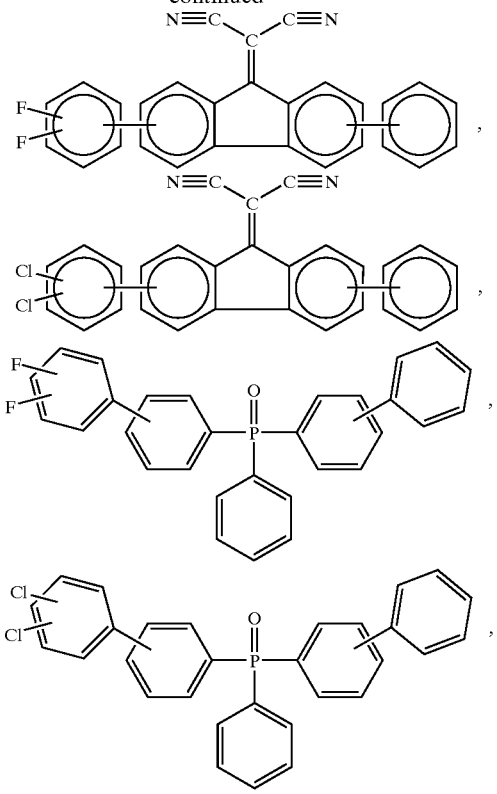

and the like. In addition, the two "Y" atoms need not be the same within a molecule, and one can be fluorine while the other is chlorine, as in the case of a fluorochlorobenzophenone. Mixtures of two or more compounds of this formula can also be employed.

When e is an integer greater than 0, the first reaction mixture also contains a material of the formula

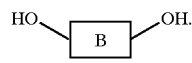

In the material of the formula

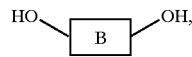

"B" is as defined for the resulting polymer composition as set forth hereinabove. Specific examples of suitable materials of this formula include those of the formula

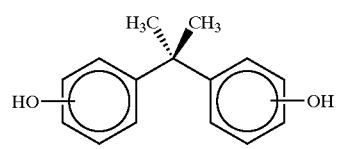

such as bisphenol-A, of the formula
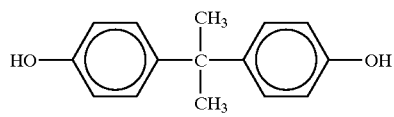
those of the formula
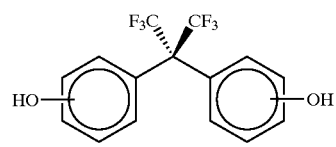
such as hexafluorobisphenol-A, of the formula
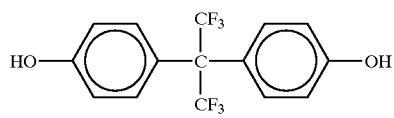
those of the formula
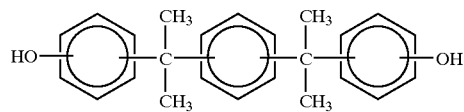
such as bisphenol-M, of the formula
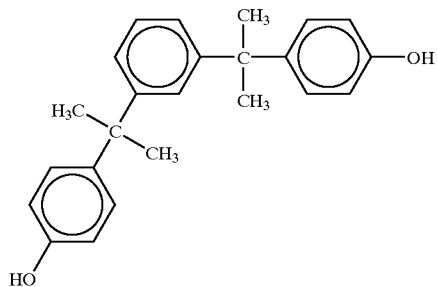
those of the formula
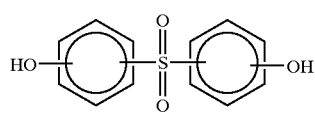
such as bisphenol-S, of the formula
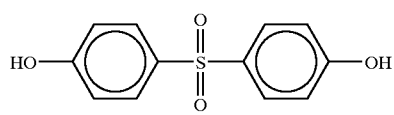
those of the formula
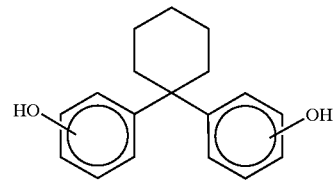
such as bisphenol-Z, of the formula
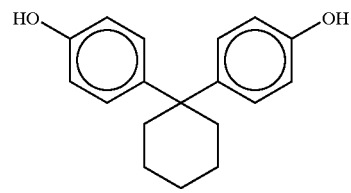
compounds of the formulae
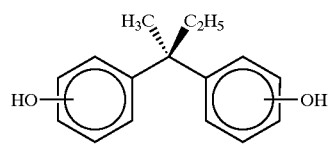
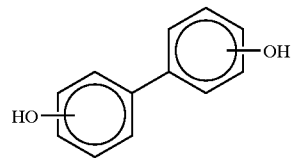
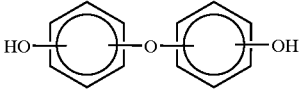
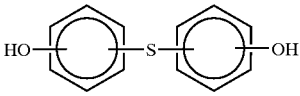
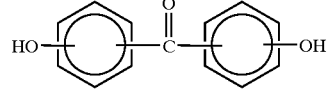
$$HO-(CH_2)_v-OH$$
wherein v is an integer of from 1 to about 20,
$$HO-(CH_2O)_t-OH$$

wherein t is an integer of from 1 to about 20,

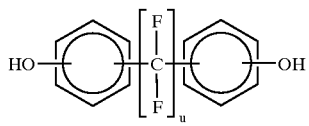

wherein u is an integer of from 1 to about 20,

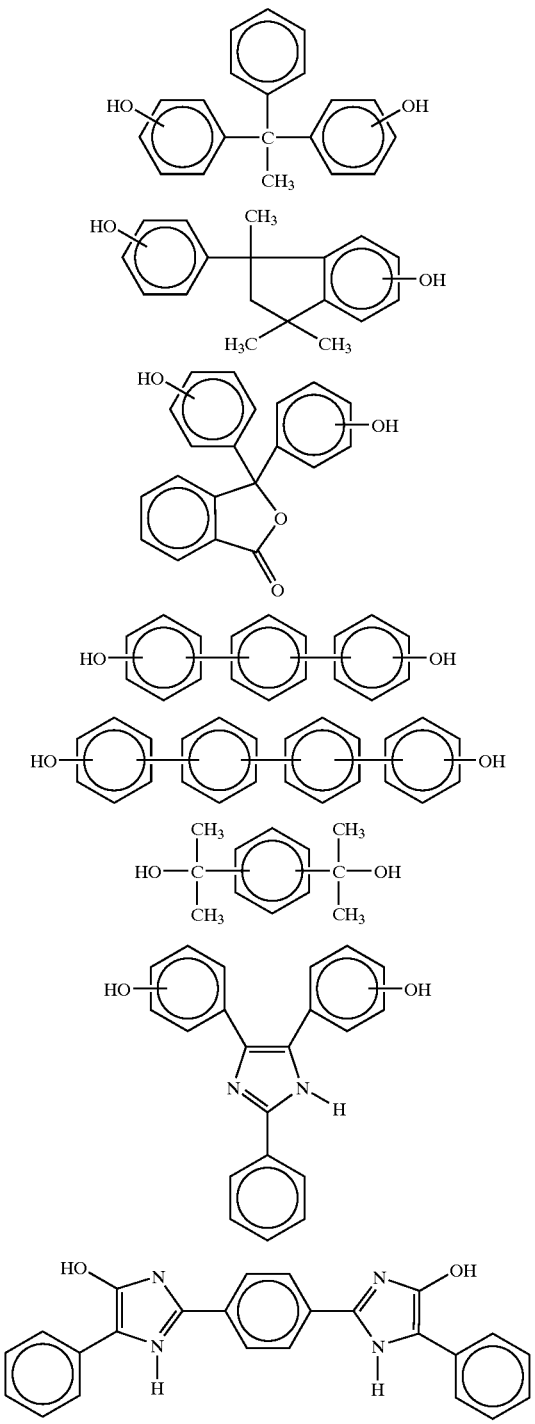

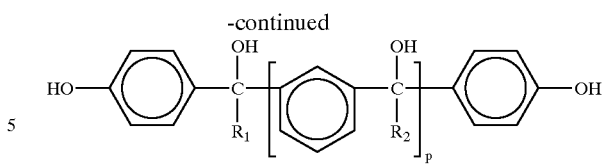

wherein $R_1$ and $R_2$ each, independently of the other, are alkyl groups, aryl groups, or mixtures thereof, and p is an integer of 0 or 1,

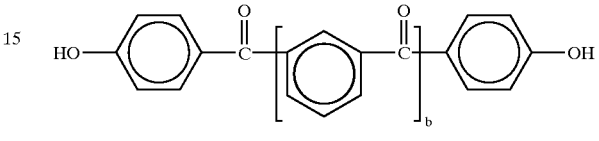

wherein b is an integer of 0 or 1,

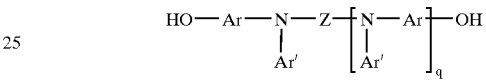

wherein Z, Ar, Ar', and q are as defined hereinabove with respect to the "B" groups, and the like. Mixtures of two or more compounds of this formula can also be employed. The material of the formula

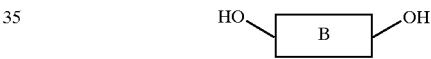

can be present in any desired or effective amount to result in a copolymer having the desired ratio of "B" groups therein. The polymer can also have no "B" groups therein, when e is 0, resulting in a polymer of the formula

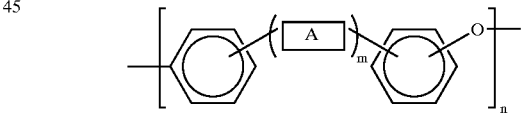

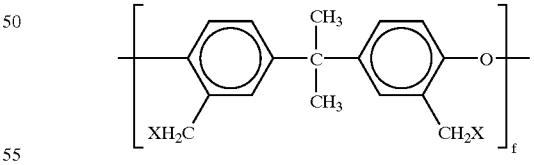

or

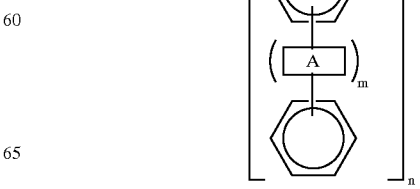

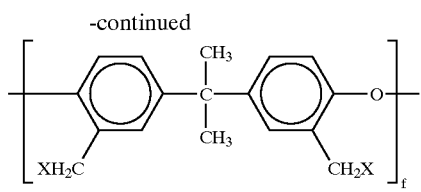

The material of the formula

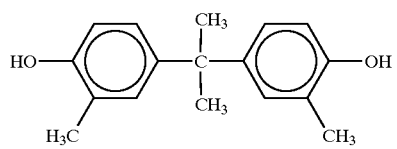

is commercially available as bisphenol-C from, for example, TCI America, Portland, Oreg. as 2,2-bis(4-hydroxyl-3-methylphenyl)propane. The bisphenol-C is present in the first reaction mixture in any desired or effective relative amount, in one embodiment at least about 0.05 moles of bisphenol-C per every one mole of monomer of the formula

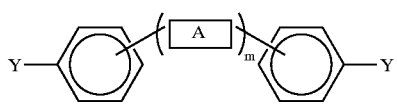

or

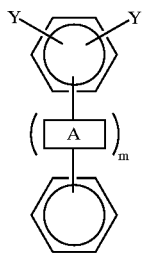

in another embodiment at least about 0.2 moles of bisphenol-C per every one mole of monomer of the formula

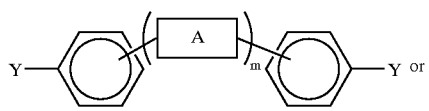

or

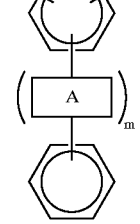

and in yet another embodiment at least about 0.5 moles of bisphenol-C per every one mole of monomer of the formula

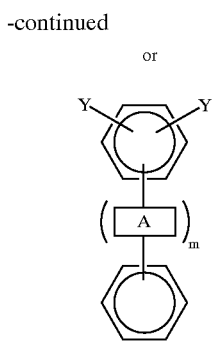

and in one embodiment no more than about 1.5 moles of bisphenol-C per every one mole of monomer of the formula

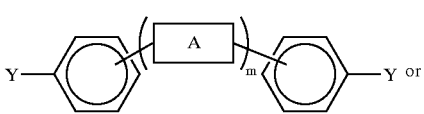

or

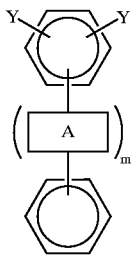

in another embodiment no more than about 1.2 moles of bisphenol-C per every one mole of monomer of the formula

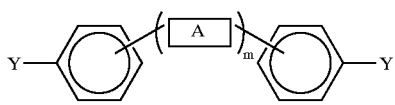

or

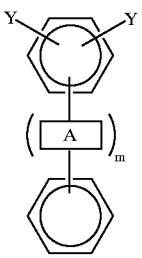

and in yet another embodiment no more than about 0.9 moles of bisphenol-C per every one mole of monomer of the formula

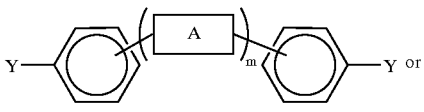

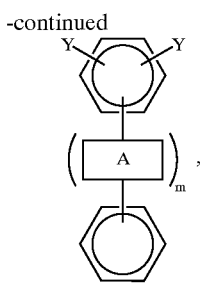

although the relative amount of bisphenol-C can be outside of these ranges.

The selected first solvent can be any polar aprotic solvent suitable for this particular reaction. Examples of suitable first solvents include N,N-dimethylacetamide, sulfolane (also called tetramethylene sulfone, or TMS), dimethyl formamide, dimethyl sulfoxide, N-methyl pyrrolidinone, hexamethylphosphoric triamide (HMPA), carbon tetrachloride, and the like, as well as mixtures thereof.

The first solvent is present in the first reaction mixture in any desired or effective relative amount, in one embodiment at least about 1 percent by weight solid reactants in the solvent, in another embodiment at least about 5 percent by weight solid reactants in the solvent, and in yet another embodiment at least about 10 percent by weight solid reactants in the solvent, and in one embodiment no more than about 75 percent by weight solid reactants in the solvent, in another embodiment no more than about 50 percent by weight solid reactants in the solvent, and in yet another embodiment no more than about 35 percent by weight solid reactants in the solvent, although the relative amount of solvent can be outside of these ranges.

Optionally, if it is desired to have the polymer terminated with a group other than halogen or phenol, the first reaction mixture can also contain a material of the formula

wherein a is an integer of from 1 to 5, preferably from 1 to about 3, and more preferably 1 and situated para to the hydroxy group, R' is a hydrogen atom, an alkyl group (including linear, branched, saturated, unsaturated, cyclic, and substituted alkyl groups, and wherein hetero atoms, such as oxygen, nitrogen, sulfur, silicon, phosphorus, and the like can be present in the alkyl group), typically with from 1 to about 20 carbon atoms, preferably with from 1 to about 8 carbon atoms, and more preferably with from 1 to about 4 carbon atoms, although the number of carbon atoms can be outside of these ranges, an aryl group (including substituted aryl groups), typically with from 2 to about 14 carbon atoms, and preferably with from about 6 to about 10 carbon atoms, an arylalkyl group (including substituted arylalkyl groups), typically with from 7 to about 50 carbon atoms, preferably with from 7 to about 23 carbon atoms, and more preferably with from 7 to about 11 carbon atoms, although the number of carbon atoms can be outside of these ranges, an alkylaryl group (including substituted alkylaryl groups), typically with from 7 to about 50 carbon atoms, preferably with from 7 to about 23 carbon atoms, and more preferably with from 7 to about 11 carbon atoms, although the number of carbon atoms can be outside of these ranges, an alkoxy group (including linear, branched, saturated, unsaturated, cyclic, and substituted alkoxy groups, and wherein hetero atoms, such as oxygen, nitrogen, sulfur, silicon, phosphorus, and the like) can be present in the alkoxy group, typically with from 1 to about 20 carbon atoms, preferably with from 1 to about 8 carbon atoms, and more preferably with from 1 to about 4 carbon atoms, although the number of carbon atoms can be outside of these ranges, an aryloxy group (including substituted aryloxy groups), typically with from 6 to about 100 carbon atoms, preferably with from about 7 to about 23 carbon atoms, and more preferably with from about 7 to about 11 carbon atoms, although the number of carbon atoms can be outside of these ranges, an arylalkyloxy group (including substituted arylalkyloxy groups), typically with from 7 to about 100 carbon atoms, preferably with from 7 to about 23 carbon atoms, and more preferably with from 7 to about 11 carbon atoms, although the number of carbon atoms can be outside of these ranges, an alkylaryloxy group (including substituted alkylaryloxy groups), typically with from 7 to about 100 carbon atoms, preferably with from 7 to about 23 carbon atoms, and more preferably with from 7 to about 11 carbon atoms, although the number of carbon atoms can be outside of these ranges, a polyalkyleneoxy group, wherein each repeat alkylene oxide unit, independently of the others in the polyalkyleneoxy group, typically has from about 2 to about 100 carbon atoms, preferably with from about 2 to about 20 carbon atoms, and more preferably with from about 2 to about 6 carbon atoms, although the number of carbon atoms can be outside of these ranges, and wherein the polyalkyleneoxy group can contain two or more different kinds of repeat alkylene oxide repeat monomer units (such as block or random copolymers of polyethylene oxide and polypropylene oxide or the like), the polyalkyleneoxy group being typically with from 1 to about 500 repeat alkyleneoxy units, preferably with from 1 to about 10 repeat alkyleneoxy units, and more preferably with from 1 to about 4 repeat alkyleneoxy units, although the number of repeat alkyleneoxy units can be outside of these ranges, and wherein the substituents on the substituted alkyl, aryl, arylalkyl, alkylaryl, alkoxy, aryloxy, arylalkyloxy, alkylaryloxy, and polyalkyleneoxy groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring. Specific examples of suitable materials of this formula include 2-methyl phenol, 3-methyl phenol, 4-methyl phenol, 2-ethyl phenol, 3-ethyl phenol, 4-ethyl phenol, 2-n-propyl phenol, 3-n-propyl phenol, 4-n-propyl phenol, 2-isopropyl phenol, 3-isopropyl phenol, 4-isopropyl phenol, 2-n-butyl phenol, 3-n-butyl phenol, 4-n-butyl phenol, 2-isobutyl phenol, 3-isobutyl phenol, 4-isobutyl phenol, 2-sec-butyl phenol, 3-sec-butyl phenol, 4-sec-butyl phenol, 2-t-butyl phenol, 3-t-butyl phenol, 4-t-butyl phenol, all possible isomers (including branched and linear) of pentyl phenol, all possible isomers (including branched and linear) of hexyl phenol, all possible isomers (including branched and linear) of heptyl phenol, all possible isomers (including branched and linear) of octyl phenol, all possible isomers (including branched and linear) of nonyl phenol, all possible isomers (including branched and linear) of decyl phenol, all possible isomers of undecyl phenol, all possible isomers (including branched and linear) of dodecyl phenol, 2-phenyl phenol, 3-phenyl phenol, 4-phenyl phenol, 2-tolyl phenol, 3-tolyl phenol, 4-tolyl phenol, 2-benzyl phenol, 3-benzyl phenol, 4-benzyl phenol, 2-methoxy phenol, 3-methoxy phenol, 4-methoxy phenol, 2-ethoxy phenol, 3-ethoxy phenol, 4-ethoxy phenol, 2-n-propoxy phenol, 3-n-propoxy phenol, 4-n-propoxy phenol, 2-isopropoxy phenol, 3-isopropoxy phenol, 4-isopropoxy phenol, 2-n-butoxy phenol, 3-n-butoxy phenol, 4-n-butoxy phenol, 2-isobutoxy phenol, 3-isobutoxy phenol, 4-isobutoxy phenol, 2-sec-butoxy phenol, 3-sec-butoxy phenol, 4-sec-butoxy phenol, 2-t-butoxy phenol, 3-t-butoxy phenol, 4-t-butoxy phenol, all possible isomers of pentyloxy phenol, all possible isomers (including branched and linear) of hexyloxy phenol, all possible isomers (including branched and linear) of heptyloxy phenol, all possible isomers (including branched and linear) of octyloxy phenol, all possible isomers (including branched and linear) of nonyloxy phenol, all possible isomers (including branched and linear) of decyloxy phenol, all possible isomers (including branched and linear) of undecyloxy phenol, all possible isomers (including branched and linear) of dodecylocy phenol, 2-phenoxy phenol, 3-phenoxy phenol, 4-phenoxy phenol, 2-tolyloxy phenol, 3-tolyloxy phenol, 4-tolyloxy phenol, 2-benzyloxy phenol, 3-benzyloxy phenol, 4-benzyloxy phenol, 2-(polyethyleneoxy) phenol, 3-(polyethyleneoxy) phenol, 4-(polyethyleneoxy) phenol, 2-(polypropyleneoxy) phenol, 3-(polypropyleneoxy) phenol, 4-(polypropyleneoxy) phenol, 2-(polybutyleneoxy) phenol, 3-(polybutyleneoxy) phenol, 4-(polybutyleneoxy) phenol, all 2,3-disubstituted variants of the above compounds, all 2,4-disubstituted variants of the above compounds, all 2-5-disubstituted variants of the above compounds, all 2-6-disubstituted variants of the above compounds, all 3,4-disubstituted variants of the above compounds, all 3,5-disubstituted variants of the above compounds, all 2,3,4-trisubstituted variants of the above compounds, all 2,3,5-trisubstituted variants of the above compounds, all 2,3,6-trisubstituted variants of the above compounds, all 2,4,5-trisubstituted variants of the above compounds, all 2,4,6-trisubstituted variants of the above compounds, all 3,4,5-trisubstituted variants of the above compounds, all 3,4,6-trisubstituted variants of the above compounds, all 2,3,4,5-tetrasubstituted variants of the above compounds, all 2,3,4,6-tetrasubstituted variants of the above compounds, all 2,3,5,6-tetrasubstituted variants of the above compounds, all pentasubstituted variants of the above compounds, and the like, as well as mixtures thereof. The resulting polymer has terminal end groups based on this material, being of the formula

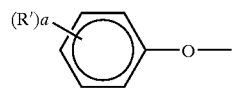

(for the terminal group on the left side of the polymer formula) or

(for the terminal group on the right side of the polymer formula).

The optional material of the formula

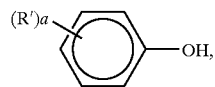

when present, is present in the first reaction mixture in any desired or effective amount, in one embodiment at least about 0.01 mole of material of the formula

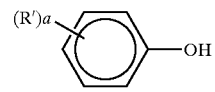

per every one mole of monomer of the formula

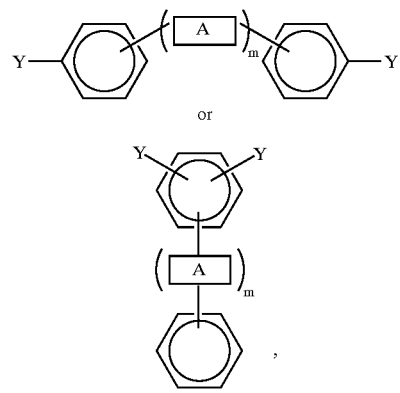

in another embodiment at least about 0.1 mole of material of the formula

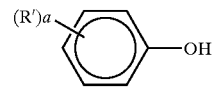

per every one mole of monomer of the formula

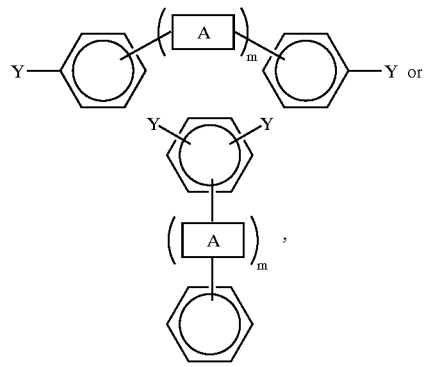

and in yet another embodiment at least about 0.2 mole of material of the formula

per every one mole of monomer of the formula

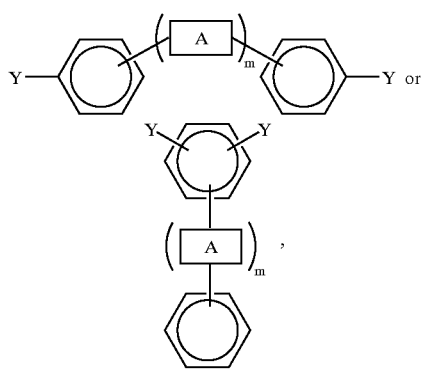

and in one embodiment no more than about 0.5 mole of material of the formula

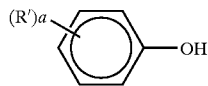

per every one mole of monomer of the formula

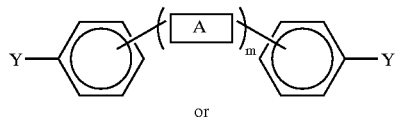

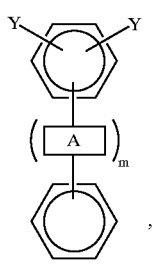

although the relative amount of material of the formula

can be outside of these ranges.

When the optional material of the formula

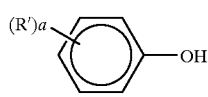

is used, the first reaction mixture also contains a carbonate base. The carbonate base can be any desired material, such as lithium carbonate, sodium carbonate, potassium carbonate, cesium carbonate, or the like, with potassium carbonate and cesium carbonate being preferred. The carbonate base is present in the first reaction mixture in any desired or effective amount, typically at least about 1.05 moles of carbonate base per every one mole of the compound

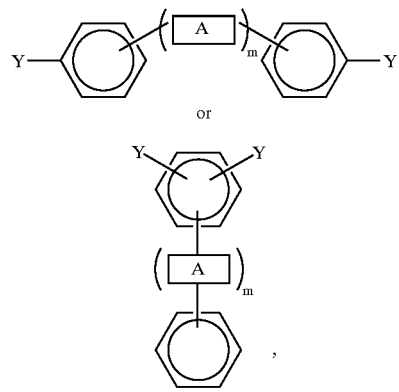

preferably at least about 1.1 moles of carbonate base per every one mole of the compound

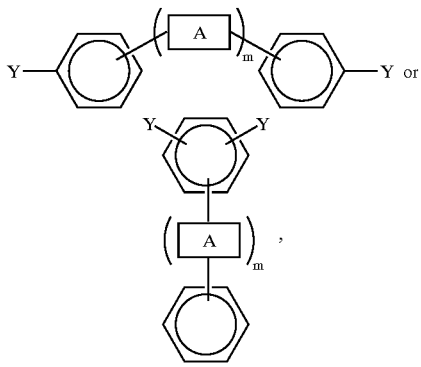

and more preferably at least about 1.2 moles of carbonate base per every one mole of the compound

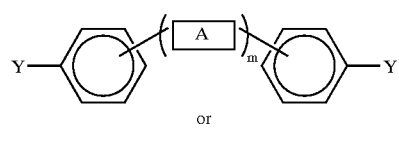

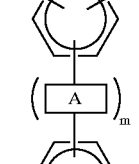

and typically no more than about 2 moles of carbonate base per every one mole of the compound

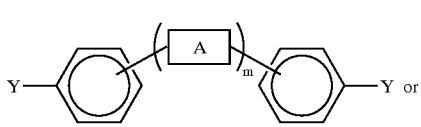

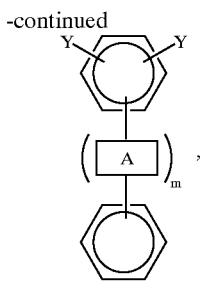

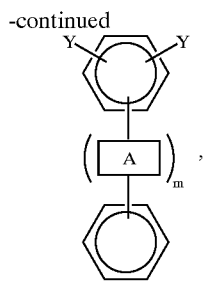

preferably no more than about 1.5 moles of carbonate base per every one mole of the compound

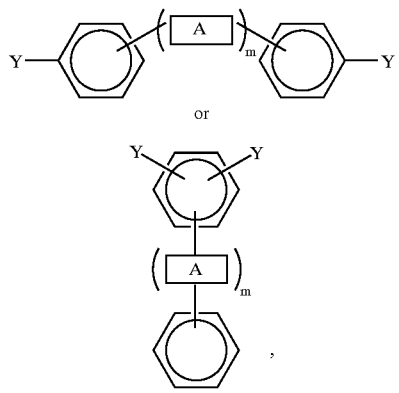

and more preferably no more than about 1.3 moles of carbonate base per every one mole of the compound

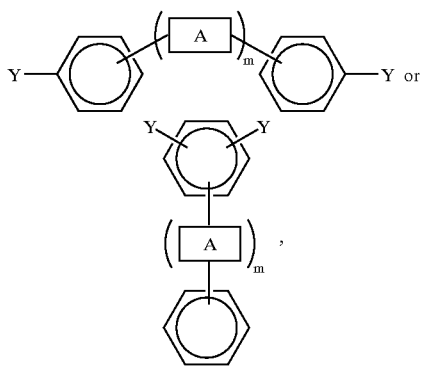

although the amount can be outside of these ranges.

Further information regarding this optional end-capping additive and the carbonate base are disclosed in, for example, Copending Application U.S. Ser. No. 10/040,850, the disclosure of which is totally incorporated herein by reference.

The first reaction mixture containing the material of the formula

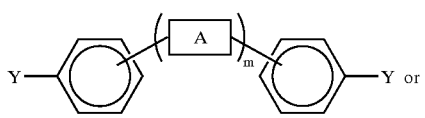

the solvent, the bisphenol-C, and any optional ingredients is heated to any desired or effective temperature, in one embodiment at least about 100° C., in another embodiment at least about 120° C., and in yet another embodiment at least about 140° C., and in one embodiment no more than about 180° C., in another embodiment no more than about 170° C., and in yet another embodiment no more than about 160° C., although the temperature can be outside of these ranges.

The reaction typically (although not necessarily) is carried out in the presence of an inert atmosphere, such as nitrogen, argon, or the like.

The first reaction mixture containing the material of the formula

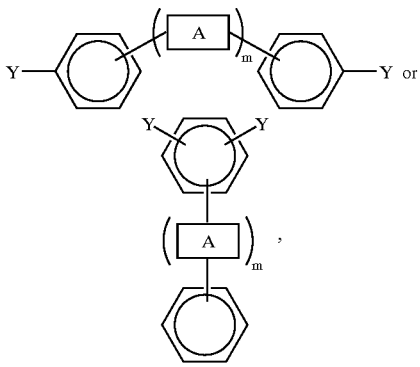

the solvent, the bisphenol-C, and any optional ingredients is allowed to react for any desired or effective period of time, in one embodiment at least about 0.5 hour, in another embodiment at least about 2 hours, and in yet another embodiment at least about 5 hours, and in one embodiment no more than about 10 hours, in another embodiment no more than about 9 hours, and in yet another embodiment no more than about 8 hours, although the period of time can be outside of these ranges.

Water is generated during the polymerization reaction, and this water is removed from the reaction mixture because of the instability of phenoxide compounds in the presence of water. One method of removing water is by azeotropic distillation with a solvent such as toluene. Any other desired or effective method for removing water from the first reaction mixture can also be employed. The solvent is present in the first reaction mixture in any effective amount, typically at least about 1 percent by weight of the reactor contents, and preferably at least about 12 percent by weight of the reactor contents, and typically no more than about 30 percent by weight of the reactor contents, and preferably no more than about 15 percent by weight of the reactor contents, although the amount of solvent can be outside of these ranges.

Subsequent to completion of the reaction, the intermediate polymer of the formula

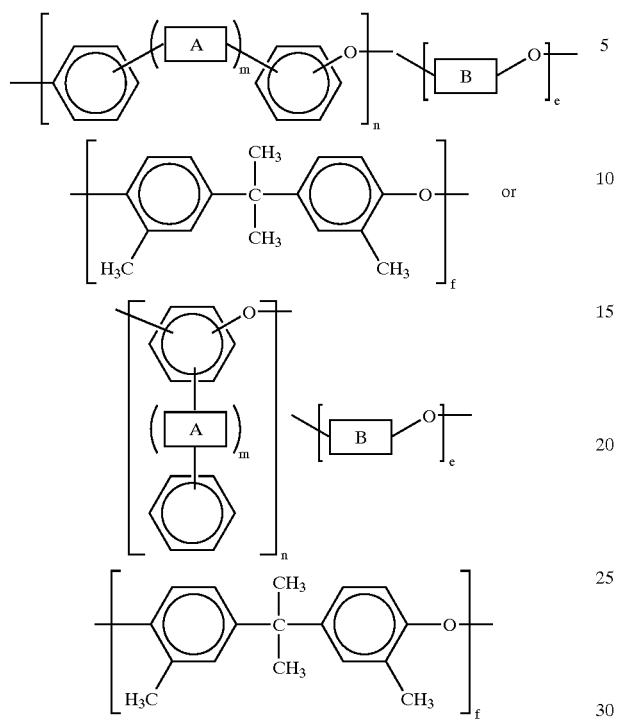

is isolated by any desired method or combination of methods, such as precipitation into a non-solvent (such as methanol) and collection by filtration, vacuum removal of solvent, spraying into water and collection by filtration, or the like.

The intermediate polymer (and the final polymer prepared according to the present invention) generally has repeat units ordered such that monomers of the formula

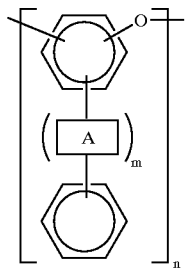

are bonded to monomers of the formula

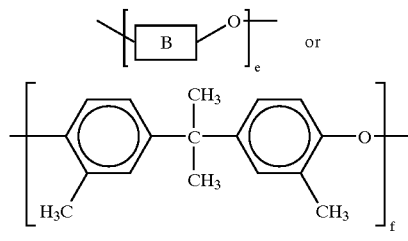

Accordingly, if one refers to the monomers of the formula

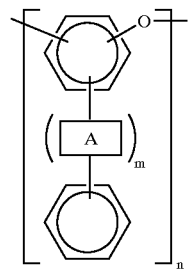

as "A", monomers of the formula

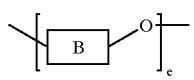

as "B", and monomers of the formula

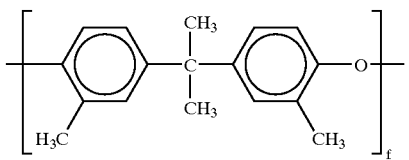

as "C", when there are no optional "B" monomers present, the polymer is an alternating copolymer of the formula -A-C-A-C-A-C—. When the optional "B" monomers are also present, they are distributed randomly throughout the polymer but are always bound to an "A" monomer, as, for example, in the following: -A-B-A-C-A-C-A-C-A-B-A-B-A-C—.

Thereafter, the intermediate polymer of the formula

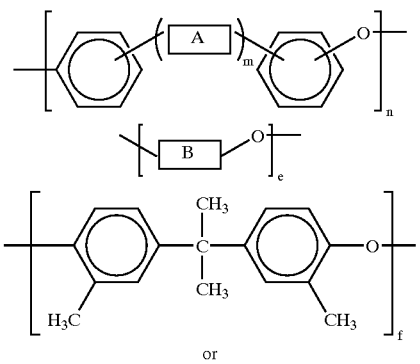

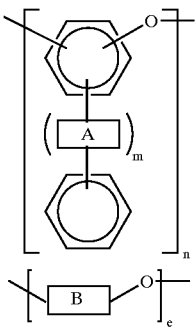

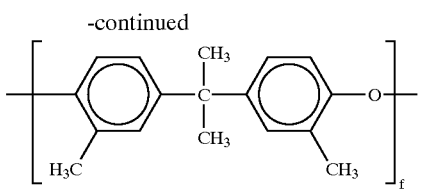

is admixed with a second solvent and a N-halosuccinimide. The second solvent can be any desired solvent suitable for this particular reaction that is inert with respect to the N-halosuccinimide. Examples of suitable second solvents include carbon tetrachloride, tetrachlorodifluoroethane, trichlorotrifluoroethane, chlorobenzene, dichlorobenzene, bromobenzene, dibromobenzene, or the like, as well as mixtures thereof.

The N-halosuccinimide can be N-chlorosuccinimide, N-bromosuccinimide, or N-iodosuccinimide, all of which are commercially available from, for example, Aldrich Chemical Co., Milwaukee, Wis. The N-halosuccinimide is present in the second reaction mixture in any desired or effective amount. Increasing the amount of N-halosuccinimide increases the percentage of methyl groups on the polymer that are converted to halomethyl groups. When the resulting halogenated polymer is used as an intermediate in the formation of a photosensitive material in which the halomethyl groups are replaced with photosensitive groups, the percentage of methyl groups on the polymer that are converted to halomethyl groups in turn controls the photosensitivity of the resulting polymer and the crosslink density of the crosslinked photosensitive polymer thus formed. The amount of N-halosuccinimide in the second reaction mixture can be in one embodiment at least about 0.01 mole of N-halosuccinimide per every one mole of methyl groups on the intermediate polymer of the formula

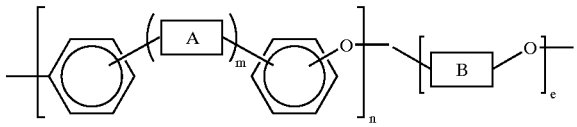

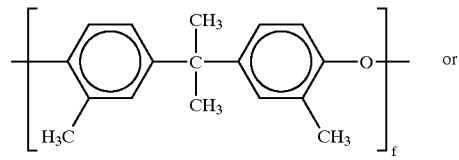

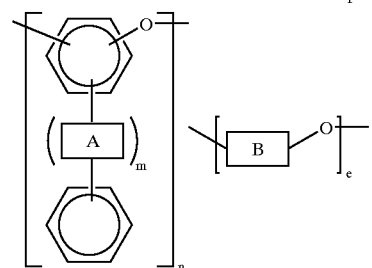

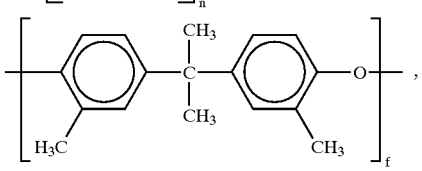

in another embodiment at least about 0.1 mole of N-halosuccinimide per every one mole of methyl groups on the intermediate polymer of the formula

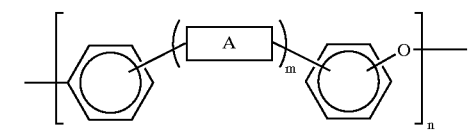

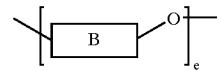

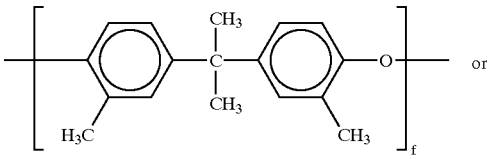 or

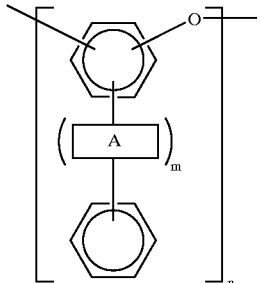

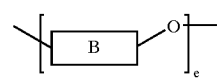

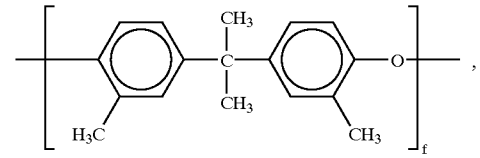

and in yet another embodiment at least about 0.5 mole of N-halosuccinimide per every one mole of methyl groups on the intermediate polymer of the formula

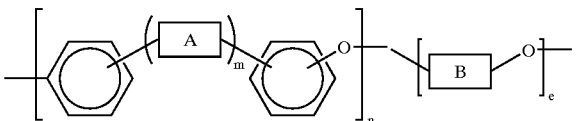

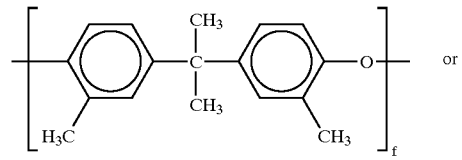 or

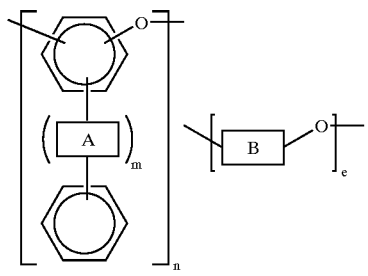

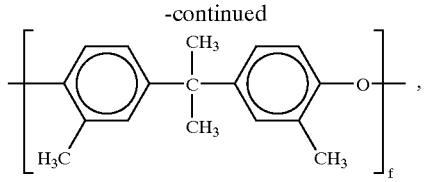

and in one embodiment no more than about 1 mole of N-halosuccinimide per every one mole of methyl groups on the intermediate polymer of the formula

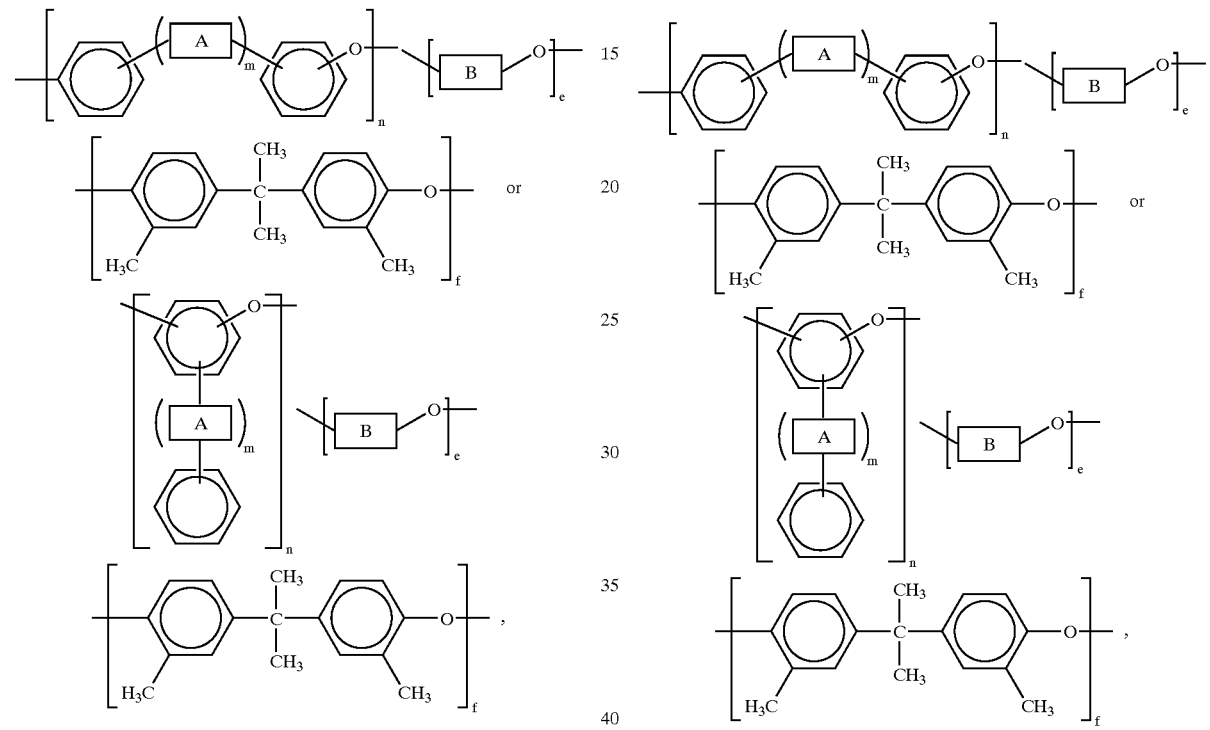

in another embodiment no more than about 0.9 mole of N-halosuccinimide per every one mole of methyl groups on the intermediate polymer of the formula

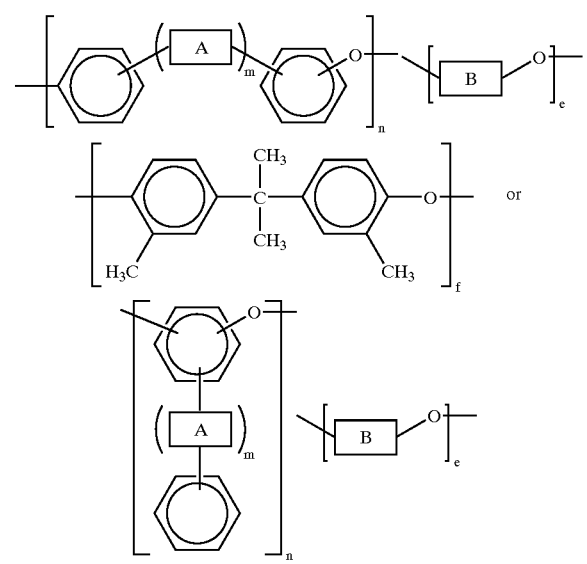

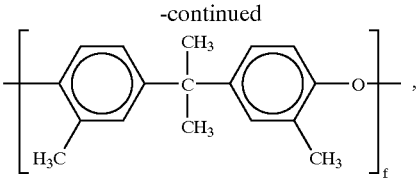

and in yet another embodiment no more than about 0.8 mole of N-halosuccinimide per every one mole of methyl groups on the intermediate polymer of the formula although the relative amount of N-halosuccinimide can be outside of these ranges.

The second reaction mixture can also optionally contain other ingredients, such as radical initiators, including benzoyl peroxide, AIBN (azobisisobutylnitrile), and the like, as well as mixtures thereof, to accelerate the reaction. Radical initiators are commercially available from, for example Aldrich Chemical Co., Milwaukee, Wis., and other commercial suppliers. When present, the radical initiator is present in any desired or effective amount, in one embodiment at least about 0.01 mole percent of the N-halosuccinimide, and in one embodiment no more than about 0.1 mole percent of the N-halosuccinimide, although the amount can be outside of these ranges.

The reaction mixture containing the polymer of the formula

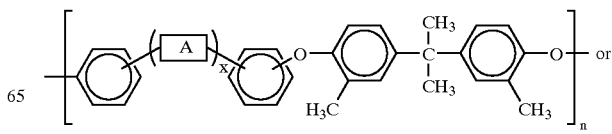

-continued

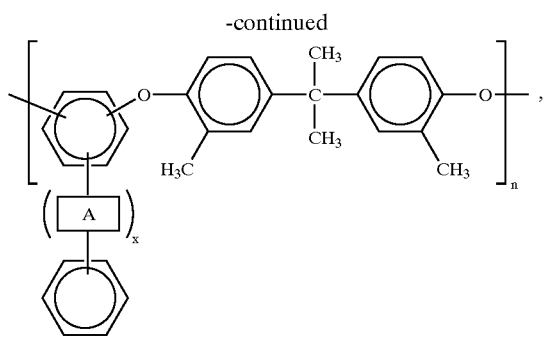

and the N-bromosuccinimide is heated to any desired or effective temperature, in one embodiment at least about 40° C., and in another embodiment at least about 50° C., and in one embodiment no more than about 70° C., and in another embodiment no more than about 60° C., although the temperature can be outside of these ranges.

The reaction typically (although not necessarily) is carried out in the presence of an inert atmosphere, such as nitrogen, argon, or the like.

The second reaction mixture containing the intermediate polymer of the formula

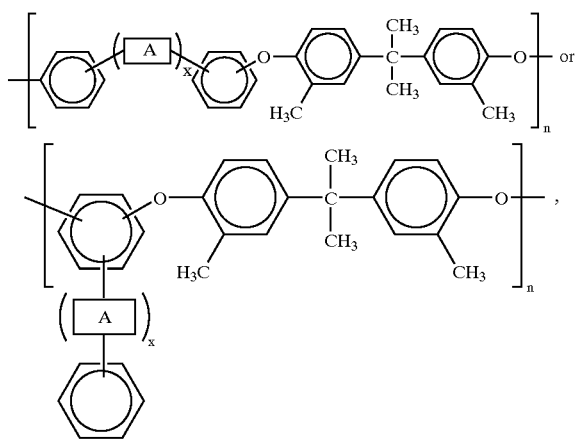

and the N-halosuccinimide is allowed to react for any desired or effective period of time, in one embodiment at least about 0.5 hour, in another embodiment at least about 1 hour, and in yet another embodiment at least about 4 hours, and in one embodiment no more than about 10 hours, in another embodiment no more than about 9 hours, and in yet another embodiment no more than about 8 hours, although the period of time can be outside of these ranges.

Subsequent to completion of the reaction, the polymer product can be isolated by any desired or effective method. For example, any insoluble material in the second reaction mixture can be filtered and the resulting filtrate can be added rapidly to a vigorously stirred solution of methanol. The fibrous polymer product can then be collected by filtration and washed with methanol until the desired level of purity is achieved.

The polymer formed by the process of the present invention can be of any desired molecular weight. The weight average molecular weight ($M_w$) in Daltons of the polymer formed is in one embodiment at least about 5,000, in another embodiment at least about 10,000, and in yet another embodiment at least about 15,000, and in one embodiment no more than about 500,000, in another embodiment no more than about 50,000, and in yet another embodiment no more than about 20,000, although the molecular weight can be outside of these ranges. Molecular weight values recited herein are values measured using gel permeation chromatography and are relative to polystyrene standards.

The halogenated polymers of the present invention can be converted to photosensitive polymers by any desired or effective method. For example, as described in U.S. Pat. No. 5,761,809, the disclosure of which is totally incorporated herein by reference, the polymer having halomethyl groups can be reacted with a material selected from the group consisting of unsaturated ester salts, alkoxide salts, alkylcarboxylate salts, and mixtures thereof, thereby forming a curable polymer having functional groups corresponding to the selected salt.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Part A

A polymer of the formula

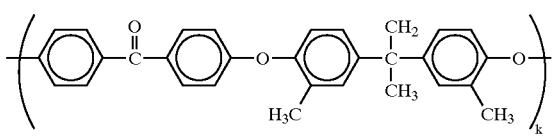

having a left terminal group of the formula

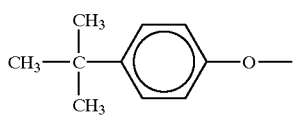

and a right terminal group of the formula

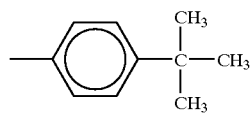

wherein k represents the number of repeat monomer units was prepared as follows. Potassium carbonate (437.7 grams, 3.167 mol; obtained from Caledon Laboratories, Georgetown, Ontario), bisphenol-C (339.7 grams, 1.327 mol; obtained from TCI Chemical Co., Portland, Oreg.), 4,4'-difluorobenzophenone (312.9 grams, 1.434 mol; obtained from Oakwood Chemicals, West Columbia, S.C. and Honeywell Specialty Chemicals, Morristown, N.J.), 4-t-butyl phenol (32.4 grams, 0.216 mol; obtained from Aldrich Chemical Canada, Oakville, Ontario), toluene (173.0 grams, 200.0 milliliters; obtained from Caledon Laboratories, Georgetown, Ontario), and N,N-dimethylacetamide (1,894.0 grams, 2,021.3 milliliters; obtained from Aldrich Chemical Canada, Oakville, Ontario) were added to a 3-necked 5 liter Morton flask fitted with a Claisen adapter, nitrogen bubbler, submersible thermometer, and 500 milliliter still head containing toluene (370 milliliters) topped with a water-jacketed condenser. The reaction mixture was agitated mechanically at 500 rpm using an IKA RW 20 DZM.n overhead stirrer with glass stir rod and TEFLON® blade. The reaction mixture was refluxed for 6 hours under a slow nitrogen purge while the distillate was allowed to recirculate into the reaction flask while periodically draining the produced water. After air cooling to room temperature, the reaction mixture was diluted with 1 liter of N,N-dimethylacetamide and vacuum filtered through #4 Whatman filter paper and added gradually to 30 liters of vigorously stirring methanol (obtained from Caledon Laboratories, Georgetown, Ontario). The precipitate was isolated by vacuum filtration through #1 Whatman filter paper, followed by stirring in 5 liters of deionized water for 1 hour, refiltration, subsequent stirring in 5 liters of methanol for 1 hour, and a final filtration. The precipitate was dried in a vacuum oven (30° C., 7 mtorr) for three days to yield a white free flowing powder (558 grams). $^1$H and $^{19}$F NMR spectrographs indicated that the resulting polymer had no terminal fluorine groups, and the presence of a monophenolic endgroup in the appropriate stoichiometry was confirmed.

Part B

A polymer of the formula

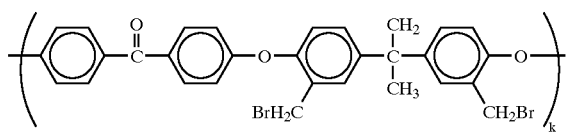

having a left terminal group of the formula

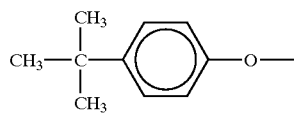

and a right terminal group of the formula

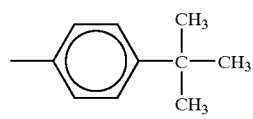

wherein k represents the number of repeat monomer units was prepared as follows. The polymer prepared in Part A of this Example (10.0 grams, 23 mmol), N-bromosuccimide (9.01 grams, 50.6 mmol; 2.2 equivalent to methyl group; obtained from Aldrich Chemical Co., Mississauga, Ontario), benzoyl peroxide (55 milligrams, 0.2 mmol; obtained from Aldrich Chemical Co., Mississauga, Ontario), and N,N-dimethylacetamide (1,894.0 grams, 2,021.3 milliliters; obtained from Aldrich Chemical Canada, Oakville, Ontario) were added to a 3-necked 250 liter round bottomed flask fitted with a nitrogen inlet, a water-jacketed condenser, and a glass stopper. The reaction mixture was agitated mechanically at 500 rpm using an IKA RW 20 DZM.n overhead stirrer with glass stir rod and TEFLON® blade. The reaction mixture was refluxed for 16 hours under a nitrogen blanket. After air-cooling to room temperature, the reaction mixture was added to 500 milliliters of vigorously stirred methanol. The precipitate was isolated by vacuum filtration through #1 Whatman filter paper and redissolved in 100 milliliters of 1,2-dichloroethane. Any insoluble material was filtered by vacuum filtration through a #1 Whatman filter paper. This solution was then added to 500 milliliters of vigorously stirred methanol. The resulting precipitate was isolated by vacuum filtration through #1 Whatman filter paper and dried in a vacuum oven (30° C., 7 mtorr) for three days to yield a white free flowing powder (11 grams). $^1$H NMR spectrographs (CDCl$_3$) indicated that the resulting polymer had 17 percent residual methyl groups and 83 percent bromomethyl groups.

EXAMPLE II

Part A

A polymer of the formula

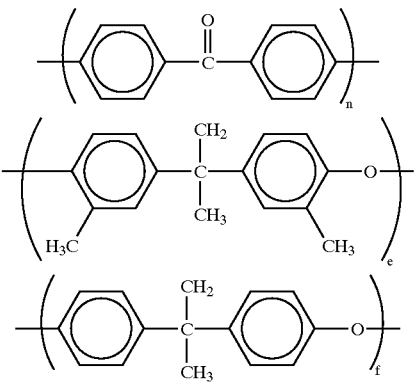

having a left terminal group of the formula

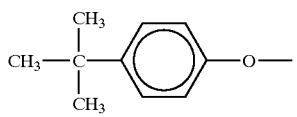

and a right terminal group of the formula

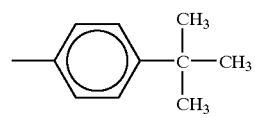

wherein n, e, and f each represent the number of repeat monomer units was prepared as follows. Potassium carbonate (437.7 grams, 3.167 mol; available from Caledon Laboratories, Georgetown, Ontario), bisphenol-A (151.45 grams, 0.6635 mol; available from Shell Canada Chemical Co., Calgary, Alberta), bisphenol-C (169.85 grams, 0.6635 mol; available from TCI Chemical Co., Portland, Oreg.) 4,4'-difluorobenzophenone (312.9 grams, 1.434 mol; available from Oakwood Chemicals, West Columbia, S.C. and Honeywell Specialty Chemicals, Morristown, N.J.), 4-t-butyl phenol (32.4 grams, 0.216 mol; available from Aldrich Chemical Canada, Oakville, Ontario), toluene (173.0 grams, 200.0 milliliters; available from Caledon Laboratories, Georgetown, Ontario), and N,N-dimethylacetamide (1,894.0 grams, 2,021.3 milliliters; available from Aldrich Chemical Canada, Oakville, Ontario) are added to a 3-necked 5 liter Morton flask fitted with a Claisen adapter, nitrogen bubbler, submersible thermometer, and 500 milliliter still head containing toluene (370 milliliters) topped with a water-jacketed condenser. The reaction mixture is agitated mechanically at 500 rpm using an IKA RW 20 DZM.n overhead stirrer with glass stir rod and TEFLON® blade. The reaction mixture is refluxed for 6 hours under a slow nitrogen purge while the distillate is allowed to recirculate into the reaction flask while periodically draining the produced water. After air cooling to room temperature, the reaction mixture is diluted with 1 liter of N,N-dimethylacetamide and vacuum filtered through #4 Whatman filter paper and added gradually to 30 liters of vigorously stirring methanol (available from Caledon Laboratories, Georgetown, Ontario). The precipitate is isolated by vacuum filtration through #1 Whatman filter paper, followed by stirring in 5 liters of deionized water for 1 hour, refiltration, subsequent stirring in 5 liters of methanol for 1 hour, and a final filtration. The precipitate is dried in a vacuum oven (30° C., 7 mtorr) for three days to yield the product. It is believed that $^1$H and $^{19}$F NMR spectrographs will indicate that the resulting polymer has no terminal fluorine groups, and that the presence of a monophenolic endgroup in the appropriate stoichiometry will be confirmed.

Part B

A polymer of the formula

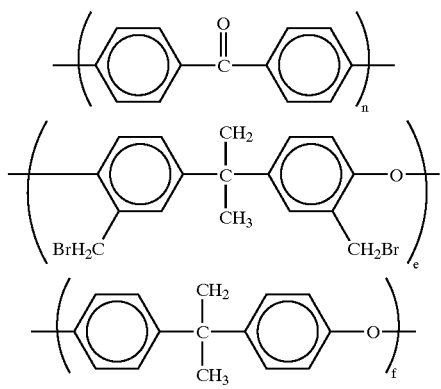

having a left terminal group of the formula

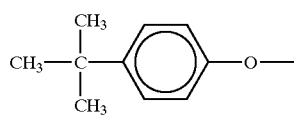

and a right terminal group of the formula

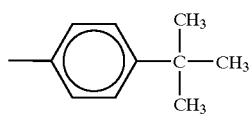

wherein n, e, and f each represent the number of repeat monomer units is prepared by the method described in Part B of Example I except that the polymer prepared in Part A of this Example is substituted for the polymer prepared in Part A of Example I.

Part C

Conversion of bromomethyl groups on the polymer prepared in Part B of this Example is carried out as follows. The polymer prepared in Part B of this Example (8.0 grams), sodium acrylate (3.5 grams, 37.2 mmol; available from Aldrich Chemical Co., Mississauga, Ontario), and N,N-dimethylacetamide (55 milliliters; available from Aldrich Chemical Canada, Oakville, Ontario) are added to an amber jar and sealed. The reaction mixture is agitated mechanically by an orbital shaker at room temperature for approximately 7 days, at which point the reaction mixture is added to 500 milliliters of vigorously stirred methanol. The resulting precipitate is isolated by vacuum filtration through #1 Whatman filter paper and redissolved in 100 milliliters of 1,2-dichloroethane. Any insoluble material is filtered by vacuum filtration through a #1 Whatman filter paper. This solution is then added to 500 milliliters of vigorously stirred methanol. The resulting precipitate is isolated by vacuum filtration through #1 Whatman filter paper and dried in a vacuum oven (30° C., 7 mtorr) for three days to yield the product. It is believed that $^1$H NMR spectrographs (CDCl$_3$) will indicate that all bromomethyl groups have been converted to acrylate groups.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A process for preparing a polymer of the formula

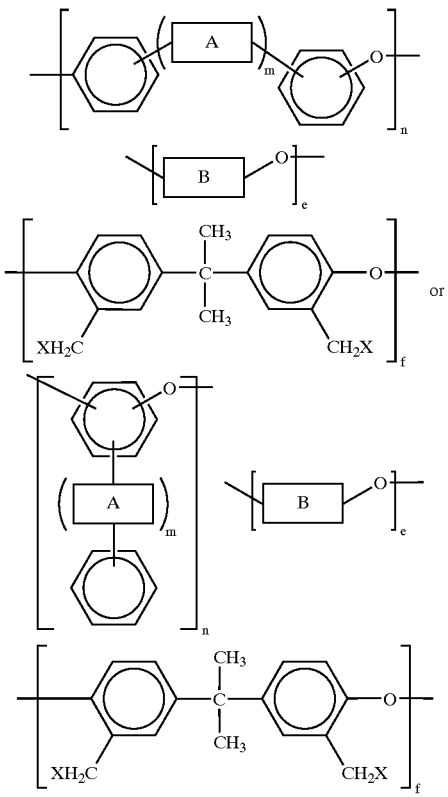

wherein m is an integer of 0 or 1, X is a halogen atom which is chlorine, bromine, or iodine, A is

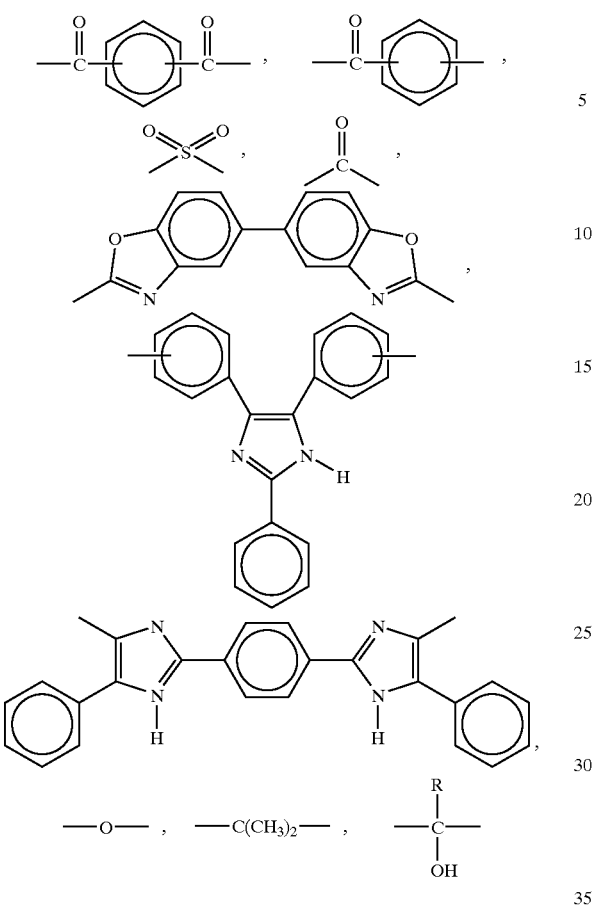
wherein R is an alkyl group, an aryl group, or mixtures thereof,
or mixtures thereof, B is
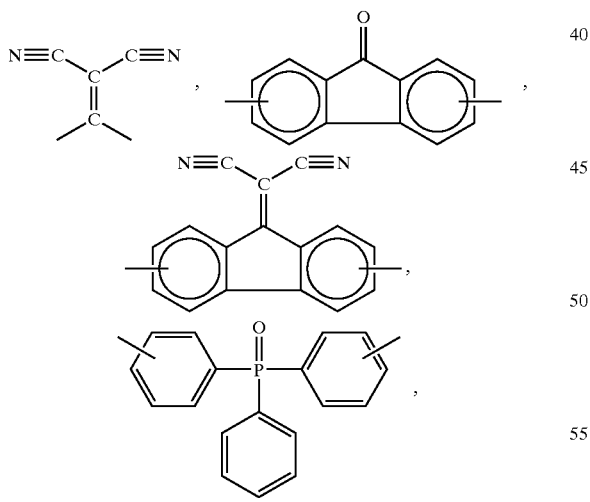
$-(CH_2)_v-$,
wherein v is an integer of from 1 to about 20,
$-(CH_2O)_t-$
wherein t is an integer of from 1 to about 20, wherein u is an integer of from 1 to about 20,
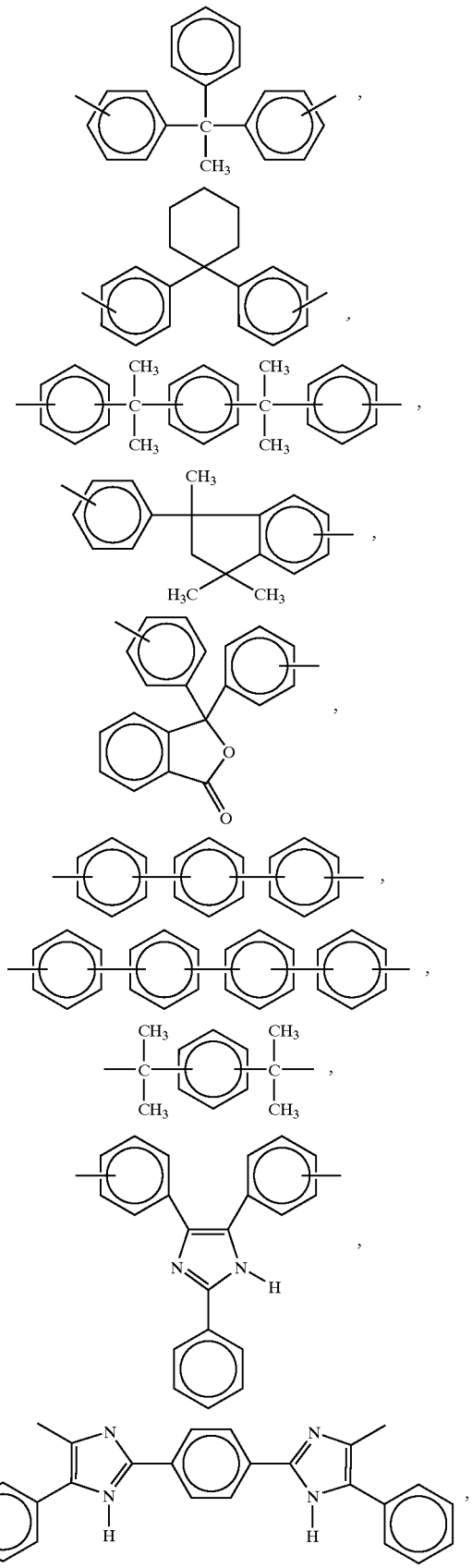
-continued
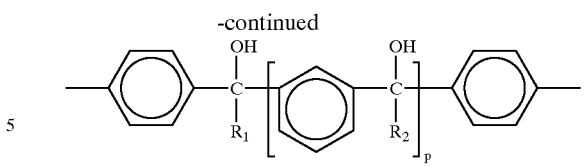
wherein $R_1$ and $R_2$ each, independently of the other, are alkyl groups, aryl groups, or mixtures thereof, and p is an integer of 0 or 1,
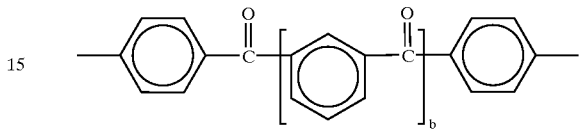
wherein b is an integer of 0 or 1,
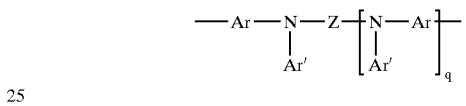
wherein (1) Z is
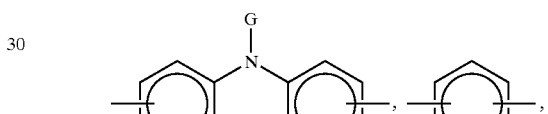
or
—Ar—(X)$_c$—Ar—
wherein c is 0 or 1; (2) Ar is
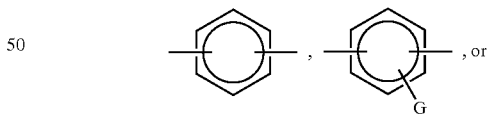
(3) G is an alkyl group selected from alkyl or isoalkyl groups containing from about 2 to about 10 carbon atoms; (4) Ar' is
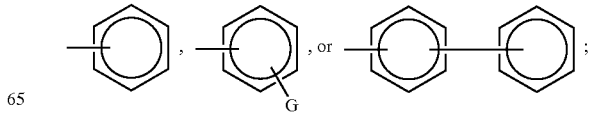

(5) X is

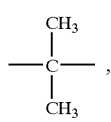

—O—,
—O—,

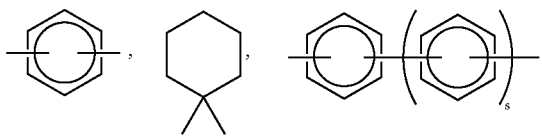

wherein s is 0, 1, or 2,

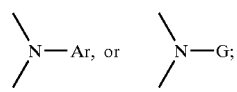

and (6) q is 0 or 1; or mixtures thereof, and n, e, and f are each, independently of the others, integers representing the number of repeating monomer units, wherein e may be 0 and wherein n and f are each at least 1, said process comprising (A) providing a first reaction mixture which comprises (i) a first solvent, (ii) a compound of the formula

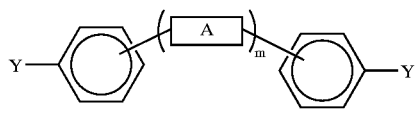

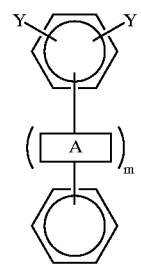

wherein Y is a chlorine atom or a fluorine atom, (iii) a compound of the formula

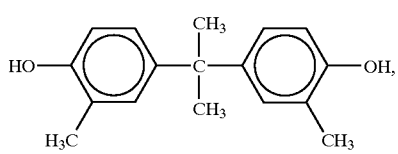

and (iv) optionally, a compound of the formula

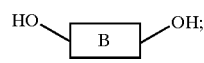

(B) heating the first reaction mixture and removing generated water from the first reaction mixture, thereby effecting a polymerization reaction and forming an intermediate polymer of the formula

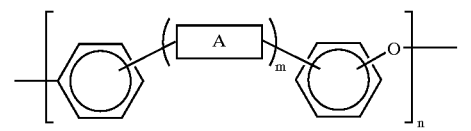

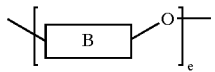

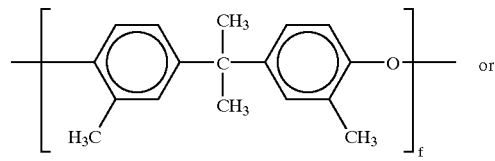

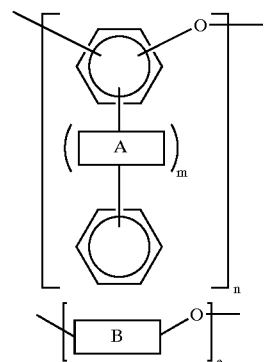

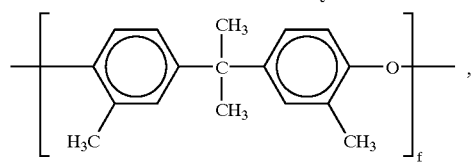

(C) providing a second reaction mixture which comprises (i) a second solvent, (ii) the intermediate polymer, and (iii) a N-halosuccinimide containing a halogen atom, wherein the halogen atom in the N-halosuccinimide is the same as the halogen atom that is X; and (D) heating the second reaction mixture, thereby effecting a polymerization reaction and forming a polymer of the formula

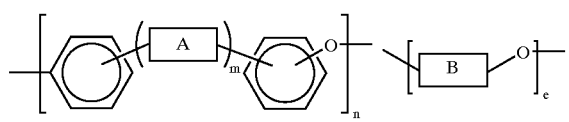

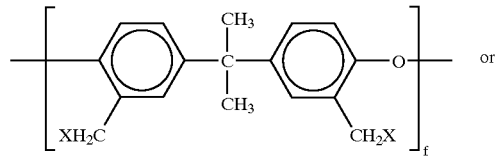

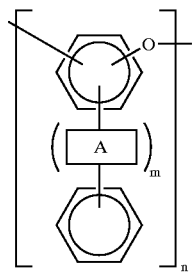
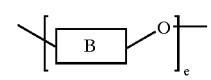

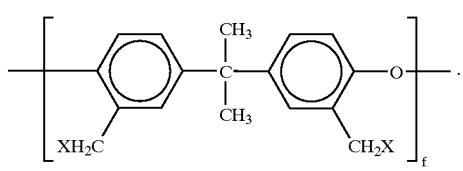

2. A process according to claim 1 wherein the polymer is of the formula

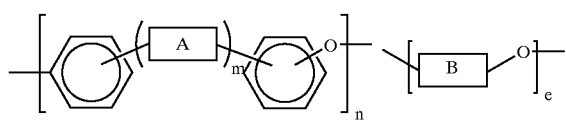

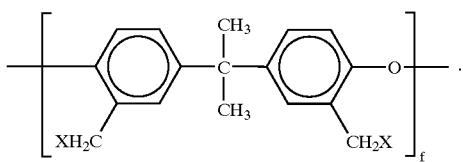

3. A process according to claim 1 wherein the polymer is of the formula

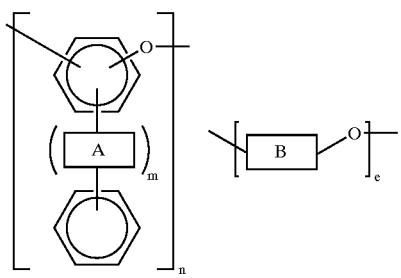

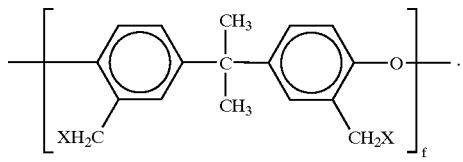

4. A process according to claim 1 wherein the polymer is of the formula

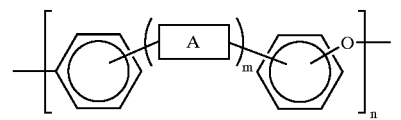

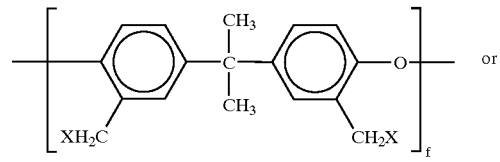

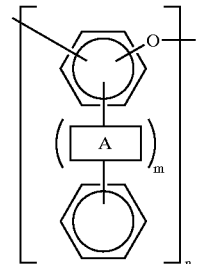

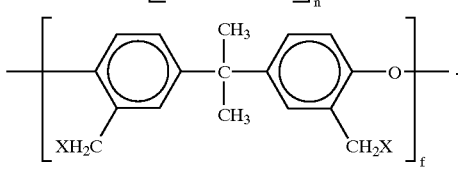

5. A process according to claim 1 wherein the compound of the formula

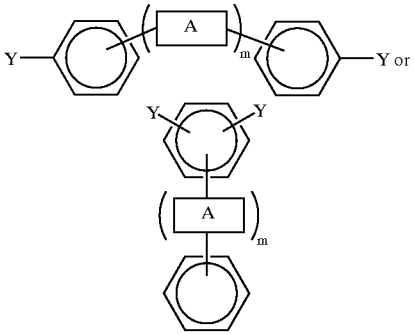

is a difluorobenzophenone or a dichlorobenzophenone.

6. A process according to claim 1 wherein the compound of the formula

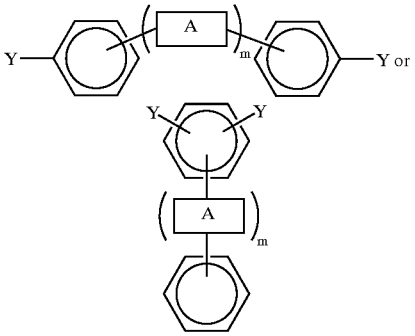

is 4,4'-difluorobenzophenone.

7. A process according to claim 1 wherein e is greater than 0 and the compound of the formula

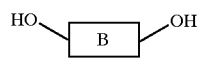

is of the formula

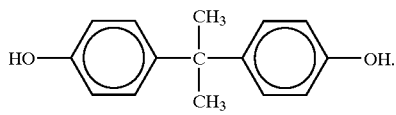

8. A process according to claim 1 wherein the polymer formed is of the formula

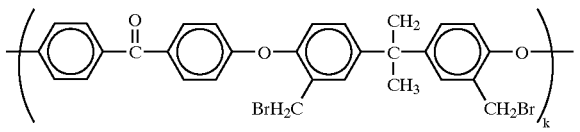

wherein k represents the number of repeat monomer units.

9. A process according to claim 1 wherein the polymer formed is of the formula

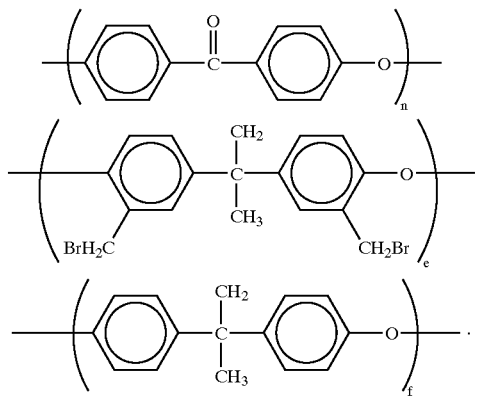

10. A process according to claim 1 wherein X is a bromine atom.

11. A process according to claim 1 wherein X is a chlorine atom.

12. A process according to claim 1 wherein X is an iodine atom.

13. A process according to claim 1 wherein the compound of the formula

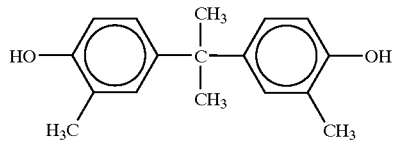

is present in the first reaction mixture in an amount of at least about 0.05 moles of compound of the formula

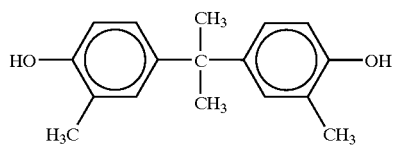

per every one mole of monomer of the formula

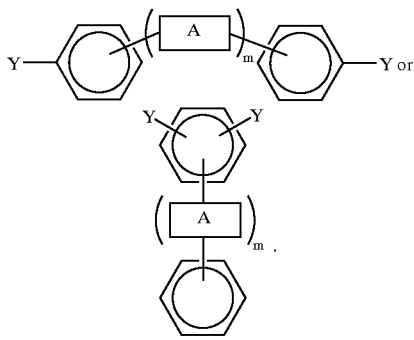

14. A process according to claim 1 wherein the compound of the formula

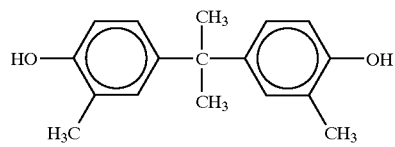

is present in the first reaction mixture in an amount of no more than about 1.5 moles of compound of the formula

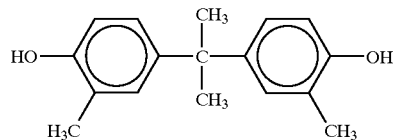

per every one mole of monomer of the formula

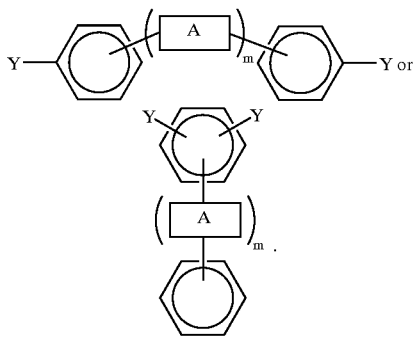

15. A process according to claim 1 wherein the first solvent is a polar aprotic solvent.

16. A process according to claim 1 wherein the first solvent is N,N-dimethylacetamide, sulfolane, dimethyl formamide, dimethyl sulfoxide, N-methyl pyrrolidinone, hexamethylphosphoric triamide, carbon tetrachloride, or mixtures thereof.

17. A process according to claim 1 wherein the first reaction mixture has a solids content of at least about 1 percent by weight solid reactants in the first solvent.

18. A process according to claim 1 wherein the first reaction mixture has a solids content of no more than about 75 percent by weight solid reactants in the first solvent.

19. A process according to claim 1 wherein the first reaction mixture also contains (I) a compound of the formula

wherein a is an integer of from 1 to 5, R' is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, or a mixture thereof, and (II) a carbonate base.

20. A process according to claim 19 wherein $R_1$ is a hydrogen atom, an alkyl group with from 1 to about 20 carbon atoms, an aryl group with from 2 to about 14 carbon atoms, an arylalkyl group with from 7 to about 50 carbon atoms, an alkylaryl group with from 7 to about 50 carbon atoms, an alkoxy group with from 1 to about 20 carbon atoms, an aryloxy group with from 6 to about 100 carbon atoms, an arylalkyloxy group with from 7 to about 100 carbon atoms, an alkylaryloxy group with from 7 to about 100 carbon atoms, a polyalkyleneoxy group wherein each repeat alkylene oxide unit, independently of the others in the polyalkyleneoxy group, has from about 2 to about 100 carbon atoms, wherein the polyalkyleneoxy group can contain two or more different kinds of repeat alkylene oxide repeat monomer units, the polyalkyleneoxy group being with from 1 to about 500 repeat alkyleneoxy units, or a mixture thereof.

21. A process according to claim 19 wherein the compound of the formula

is of the formula

22. A process according to claim 19 wherein R' is t-butyl.

23. A process according to claim 19 wherein the compound of the formula

is of the formula

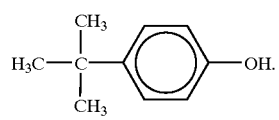

24. A process according to claim 19 wherein the carbonate base is potassium carbonate or cesium carbonate.

25. A process according to claim 19 wherein the compound of the formula

is present in the first reaction mixture in an amount of at least about 0.01 mole of material of the formula

per every one mole of monomer of the formula

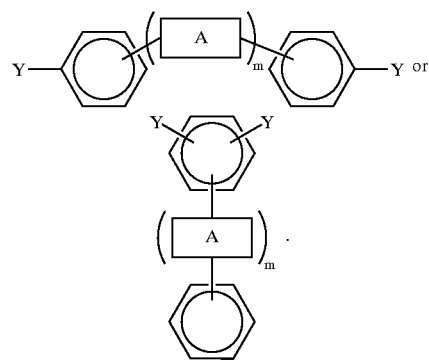

26. A process according to claim 19 wherein the compound of the formula

is present in the first reaction mixture in an amount of no more than about 0.5 mole of material of the formula

per every one mole of monomer of the formula

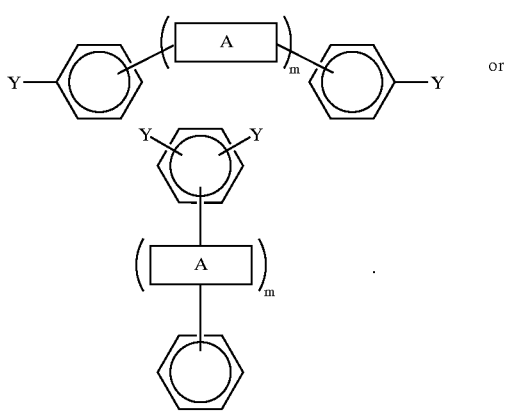

27. A process according to claim 19 wherein the carbonate base is present in the first reaction mixture in an amount of at least about 1.05 moles of carbonate base per every one mole of the compound

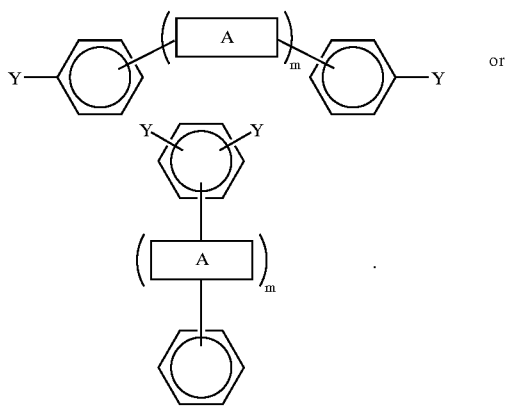

28. A process according to claim 19 wherein the carbonate base is present in the first reaction mixture in an amount of no more than about 2 moles of carbonate base per every one mole of the compound

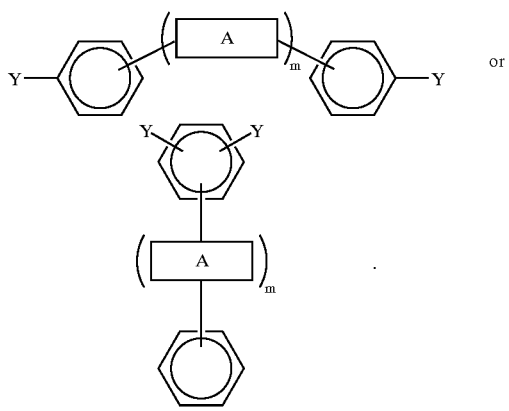

29. A process according to claim 1 wherein the first reaction mixture is heated to a temperature of at least about 100° C.

30. A process according to claim 1 wherein the first reaction mixture is heated to a temperature of no more than about 180° C.

31. A process according to claim 1 wherein the first reaction mixture is allowed to react in the presence of an inert atmosphere.

32. A process according to claim 1 wherein the first reaction mixture contents are allowed to react for a period of at least about 0.5 hour.

33. A process according to claim 1 wherein the first reaction mixture contents are allowed to react for a period of no more than about 10 hours.

34. A process according to claim 1 wherein water is removed from the first reaction mixture by azeotropic distillation.

35. A process according to claim 1 wherein the second solvent is inert with respect to the N-halosuccinimide.

36. A process according to claim 1 wherein the second solvent is carbon tetrachloride, tetrachlorodifluoroethane, trichlorotrifluoroethane, chlorobenzene, dichlorobenzene, bromobenzene, dibromobenzene, or mixtures thereof.

37. A process according to claim 1 wherein the N-halosuccinimide is N-chlorosuccinimide.

38. A process according to claim 1 wherein the N-halosuccinimide is N-bromosuccinimide.

39. A process according to claim 1 wherein the N-halosuccinimide is N-iodosuccinimide.

40. A process according to claim 1 wherein the N-halosuccinimide is present in the second reaction mixture in an amount of at least about 0.01 mole of N-halosuccinimide per every one mole of methyl groups on the intermediate polymer of the formula

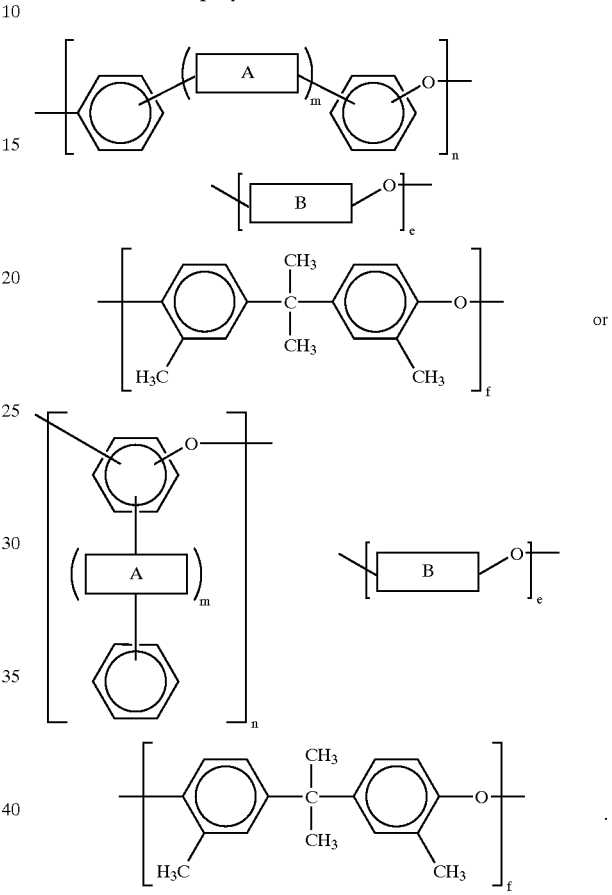

41. A process according to claim 1 wherein the N-halosuccinimide is present in the second reaction mixture in an amount of no more than about 1 mole of N-halosuccinimide per every one mole of methyl groups on the intermediate polymer of the formula

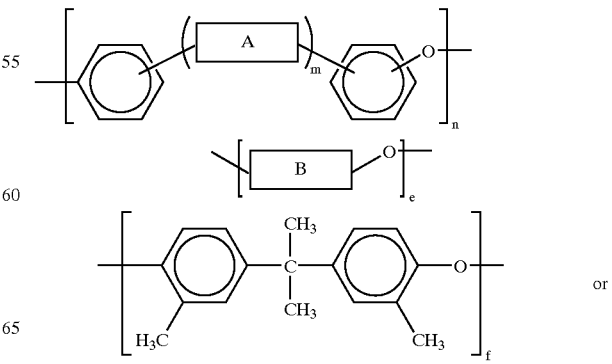

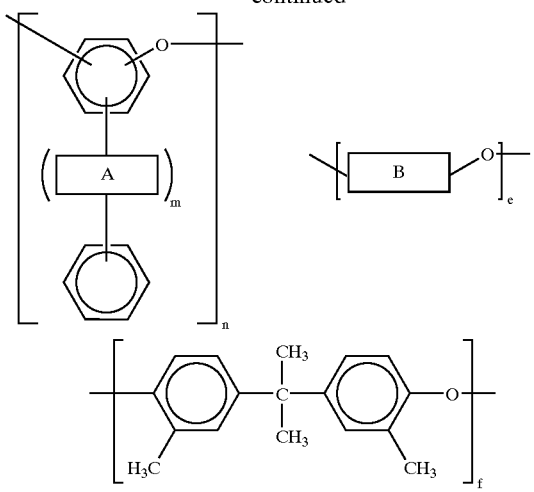

42. A process according to claim 1 wherein the second reaction mixture further contains a radical initiator.

43. A process according to claim 1 wherein the second reaction mixture is heated to a temperature of at least about 40° C.

44. A process according to claim 1 wherein the second reaction mixture is heated to a temperature of no more than about 70° C.

45. A process according to claim 1 wherein the second reaction mixture is allowed to react in the presence of an inert atmosphere.

46. A process according to claim 1 wherein the second reaction mixture contents are allowed to react for a period of at least about 0.5 hour.

47. A process according to claim 1 wherein the second reaction mixture contents are allowed to react for a period of no more than about 10 hours.

48. A process according to claim 1 wherein the polymer of the formula

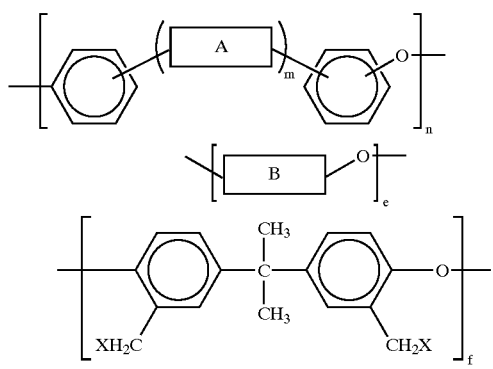

or

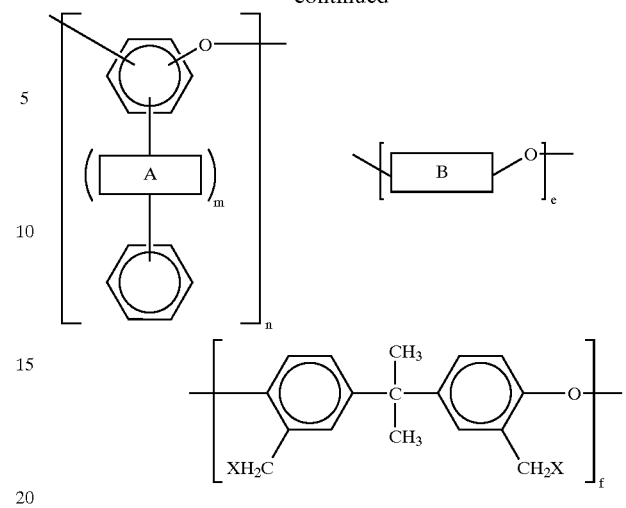

has a weight average molecular weight of at least about 5,000 Daltons.

49. A process according to claim 1 wherein the polymer of the formula

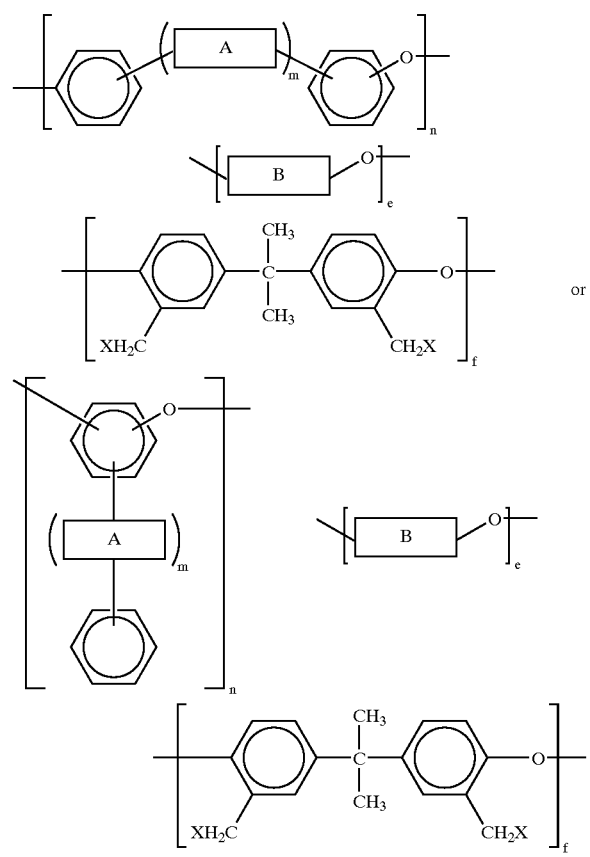

has a weight average molecular weight of no more than about 500,000 Daltons.

* * * * *